(12) United States Patent
Ikeuchi et al.

(10) Patent No.: US 8,577,208 B2
(45) Date of Patent: Nov. 5, 2013

(54) 3D VIDEO DECODING APPARATUS AND 3D VIDEO DECODING METHOD

(75) Inventors: Yohei Ikeuchi, Osaka (JP); Kengo Nishimura, Osaka (JP); Shoji Kawamura, Osaka (JP)

(73) Assignee: Panasonic Corporation, Osaka (JP)

( * ) Notice: Subject to any disclaimer, the term of this patent is extended or adjusted under 35 U.S.C. 154(b) by 289 days.

(21) Appl. No.: 13/189,834

(22) Filed: Jul. 25, 2011

(65) Prior Publication Data

US 2011/0280552 A1 Nov. 17, 2011

Related U.S. Application Data

(63) Continuation of application No. PCT/JP2010/005849, filed on Sep. 29, 2010.

(30) Foreign Application Priority Data

Nov. 11, 2009 (JP) ................................. 2009-258212

(51) Int. Cl.
*H04N 5/783* (2006.01)
*H04N 7/26* (2006.01)

(52) U.S. Cl.
USPC ...... 386/343; 375/240.27; 386/263; 386/264; 386/326; 386/335; 386/336; 386/353

(58) Field of Classification Search
USPC .................. 386/263, 264, 326, 335, 336, 353
See application file for complete search history.

(56) References Cited

U.S. PATENT DOCUMENTS

| | | | |
|---|---|---|---|
| 6,757,441 B1 | 6/2004 | Katayama et al. | |
| 2001/0052099 A1* | 12/2001 | Yano et al. | 714/755 |
| 2003/0140301 A1* | 7/2003 | Litwin et al. | 714/784 |
| 2007/0286048 A1* | 12/2007 | Hayashi | 369/59.22 |
| 2010/0026783 A1* | 2/2010 | Chiu et al. | 348/43 |

FOREIGN PATENT DOCUMENTS

| | | |
|---|---|---|
| JP | 7-322302 | 12/1995 |
| JP | 7-327242 | 12/1995 |
| JP | 07-327242 | 12/1995 |
| JP | 8-47002 | 2/1996 |

(Continued)

OTHER PUBLICATIONS

U.S. Appl. No. 13/177,118 to Tomoki Mizobuchi et al., filed Jul. 6, 2011.

(Continued)

*Primary Examiner* — Thai Q. Tran
*Assistant Examiner* — Sunghyoun Park
(74) *Attorney, Agent, or Firm* — McDermott Will & Emery LLP

(57) ABSTRACT

A 3D decoding apparatus according to the present invention includes: a decoding unit which decodes left-eye and right-eye code signals to generate left-eye and right-eye decode signals; an error determining unit which determines an error of the left-eye and the right-eye code signals; an output determining unit which determines, when there is an error in one of the left-eye and the right-eye code signals, whether the one of the code signals that is determined as including an error has an error data mount equal to or greater than a first threshold; and an output unit which outputs neither the left-eye nor the right-eye code signal when the error data amount is smaller than the first threshold, and outputs only the decode signal obtained by decoding the other of the code signals when the error data amount is equal to or greater than the first threshold.

5 Claims, 22 Drawing Sheets

(56) References Cited

FOREIGN PATENT DOCUMENTS

| | | |
|---|---:|---:|
| JP | 8-149521 | 6/1996 |
| JP | 10-243419 | 9/1998 |
| JP | 2000-134642 | 5/2000 |
| JP | 2001-186516 | 7/2001 |
| JP | 2003-319419 | 11/2003 |
| JP | 2004-166885 | 6/2004 |
| JP | 2005-110121 | 4/2005 |
| JP | 2008-103820 | 5/2008 |
| JP | 2008-306602 | 12/2008 |

OTHER PUBLICATIONS

International Search Report in PCT/JP2010/005849, dated Dec. 28, 2010.

Japan Office action in Application No. 2009-258212, mail date is Aug. 17, 2011.

* cited by examiner

3D VIDEO DECODING APPARATUS AND 3D VIDEO DECODING METHOD

CROSS REFERENCE TO RELATED APPLICATION

This is a continuation application of PCT application No. PCT/JP2010/005849 filed on Sep. 29, 2010, designating the United States of America.

BACKGROUND OF THE INVENTION (1) Field of the Invention

The present invention relates to three-dimensional (3D) video decoding apparatuses and 3D video decoding methods and particularly to a 3D video decoding apparatus which decodes the first code signal obtained by coding a video signal of the first view, and the second code signal obtained by coding a video signal of the second view different from the first view.

(2) Description of the Related Art

There is a known 3D video display apparatus which displays 3D video images (multiview video images) that are two-dimensional (2D) video images which convey a stereoscopic perception to a viewer. For example, Patent literature 1: Japanese Unexamined Patent Application Publication No. 2001-186516 discloses a technique of coding and decoding such 3D video images.

This 3D video display apparatus displays the images which convey a stereoscopic perception to a viewer, by displaying a right-eye image and a left-eye image which have a parallax therebetween. For example, the 3D display apparatus displays the right-eye image and the left-eye image alternately for each frame. In addition, the viewer uses a pair of glasses which switch, for each frame, sights between the right eye and the left eye. This allows the viewer to view the right-eye image with the right eye only and the left-eye image with the left eye only and to thereby recognize, in three dimensions, the images which the 3D video display apparatus displays.

SUMMARY OF THE INVENTION

However, in the case where there is data loss or corruption by an error, such 3D video images may be displayed as video which looks unnatural because of an instantaneous large change in the depth-wise (i.e., in the projection direction) display position in 3D presentation or because of an instantaneous change to a 2D presentation.

Furthermore, also in the case of a trick playback such as the fast-forward playback, such unnatural video may be displayed due to the instantaneous large change in the depth-wise display position in 3D or the like causes.

Thus, an object of the present invention is to provide a 3D video decoding apparatus and a 3D video decoding method, by which favorable video images can be generated in at least one of the cases with an error and in the trick play mode.

In order to achieve the above object, a 3D video decoding apparatus according to an aspect of the present invention is a 3D video decoding apparatus which decodes a first code signal obtained by coding a video signal of a first view, and a second code signal obtained by coding a video signal of a second view that is different from the first view, the 3D video decoding apparatus including: a decoding unit configured to decode the first code signal to generate a first decode signal, and to decode the second code signal to generate a second decode signal; an error determining unit configured to determine, for each predetermined data amount, whether or not there is an error in the first code signal and in the second code signal; an output determining unit configured to determine, when the error determining unit determines that there is an error in one of the first and the second code signals assigned with corresponding presentation time points and that there is no error in the other of the first and the second code signals, whether or not the one of the first and the second code signals that is determined as including an error has an error data amount equal to or greater than a first threshold; and an output unit configured not to output the first or the second decode signal that corresponds to the one or the other of the first and the second code signals, when the output determining unit determines that the error data amount is smaller than the first threshold, and to output only the first or the second decode signal which is obtained by decoding the other of the first and the second code signals, when the output determining unit determines that the error data amount is equal to or greater than the first threshold.

Thus, the present invention is capable of providing a 3D video decoding apparatus and a 3D video decoding method, by which favorable video images can be generated in at least one of the cases with an error and in the trick play mode.

FURTHER INFORMATION ABOUT TECHNICAL BACKGROUND TO THIS APPLICATION

The disclosure of Japanese Patent Application No. 2009-258212 filed on Nov. 11, 2009 including specification, drawings and claims is incorporated herein by reference in its entirety.

The disclosure of PCT application No. PCT/W2010/005849 filed on Sep. 29, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

Embodiments of the 3D video decoding apparatus according to the present invention are described in detail below with reference to the drawings.

First Embodiment

When there is an error in one of the left-eye and right-eye video images, a 3D video decoding apparatus according to the first embodiment of the present invention (i) provides 2D presentation in which only normal video images are displayed, in the case where an amount of data unable to be decoded by the error (for example, the number of successive pictures with the errors) is large, and (ii) skips both the video images with the 3D presentation maintained, in the case where the amount of data unable to be decoded by the error is small. This allows the 3D video decoding apparatus according to the first embodiment of the present invention to generate favorable video images when an error occurs.

First, a structure of a 3D video display system which includes the 3D video decoding apparatus according to the first embodiment of the present invention is described.

Figure 1:
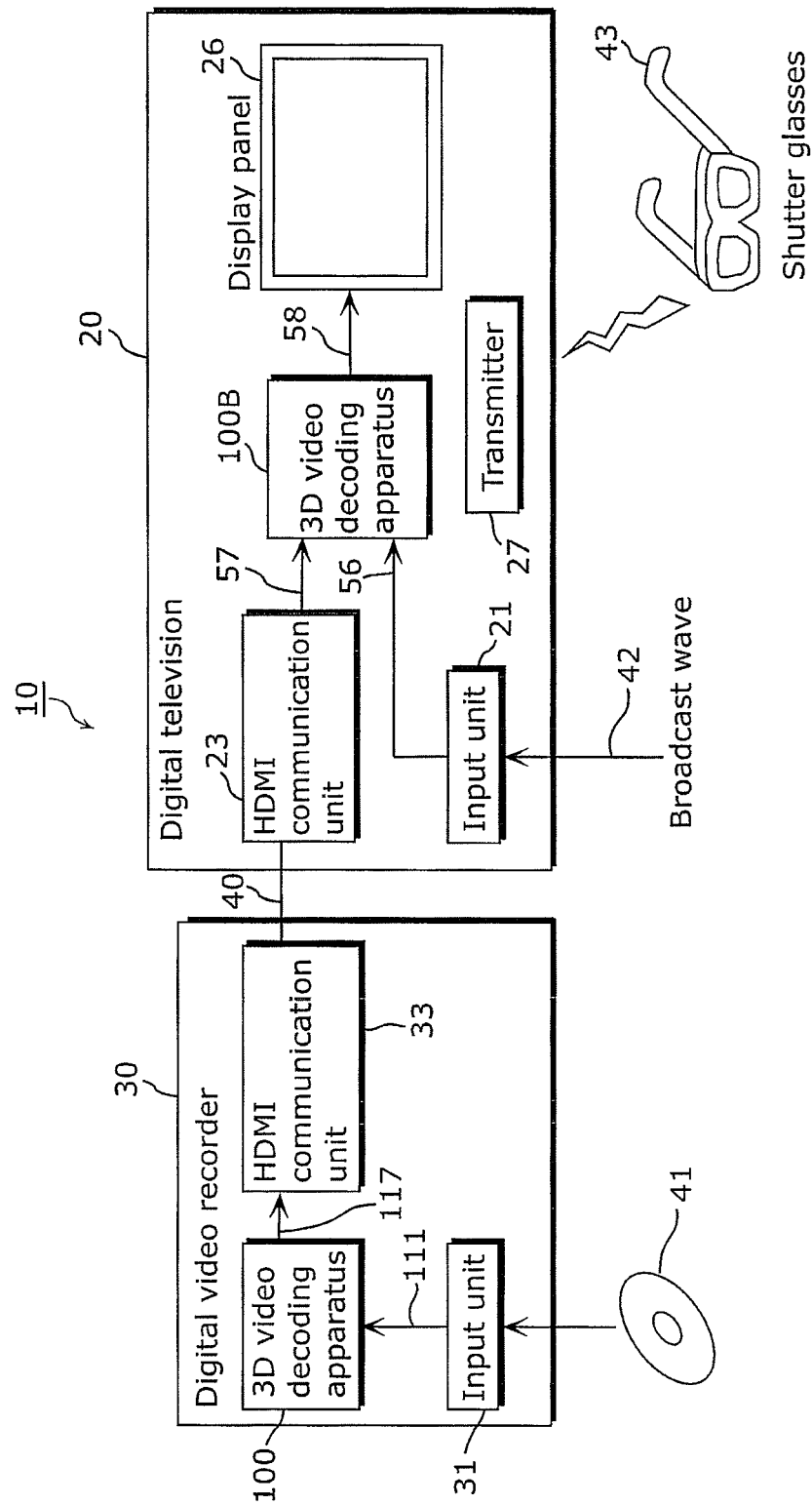
FIG. 1 is a block diagram showing a structure of a 3D video display system according to the first embodiment of the present invention.

FIG. 1 is a block diagram showing a structure of the 3D video display system according to the first embodiment of the present invention.

A 3D video display system 10 shown in FIG. 1 includes a digital television 20, a digital video recorder 30, and shutter glasses 43. The digital television 20 and the digital video recorder 30 are interconnected via a High-Definition Multimedia Interface (HDMI) cable 40.

The digital video recorder 30 processes 3D video signals recorded on an optical disc 41 such as a blu-ray disc (BD), and outputs the processed 3D video signals to the digital television 20 via the HDMI cable 40.

The digital television 20 displays 3D video images which are represented by 3D video signals output from digital video recorder 30 and by 3D video signals included in broadcast waves 42. For example, the broadcast waves 42 include digital terrestrial television broadcasting or digital satellite broadcasting.

The digital video recorder 30 may process 3D video signals recorded on a recording medium (e.g., a hard disk drive or a non-volatile memory) other than the optical disc 41. Furthermore, the digital video recorder 30 may process 3D video signals included in the broadcast waves 42 or 3D video signals obtained through communications network such as the Internet. In addition, the digital video recorder 30 may also process 3D video signals input from an external device to an external input terminal (not shown) or the like.

Likewise, the digital television 20 may display video images represented by 3D video signals recorded on the optical disc 41 and other recording media. Furthermore, the digital television 20 may display video images represented by 3D video signals obtained through communications network such as the Internet. In addition, the digital television 20 may display video images which are represented by 3D video signals input from an external device other than the digital video recorder 30 to an external input terminal (not shown) or the like.

Furthermore, the digital television 20 may perform predetermined processing on the obtained 3D video signals and display video images represented by the processed 3D video signals.

The digital television 20 and the digital video recorder 30 may also be interconnected via a standardized cable other than the HDMI cable 40 or via wireless communications network.

The digital video recorder 30 includes an input unit 31, a 3D video decoding apparatus 100, and an HDMI communication unit 33.

The input unit 31 receives input video signals 111 recorded on the optical disc 41.

The 3D video decoding apparatus 100 generates output video signals 117 by decoding the input video signals 111.

The HDMI communication unit 33 outputs the output video signals 117 generated by the 3D video decoding apparatus 100, to the digital television 20 via the HDMI cable 40.

The digital video recorder 30 may store the generated output video signals 117 into a storage unit (such as a hard disk drive or a non-volatile memory) included in the digital video recorder 30, or may also store the generated output video signals 117 onto a recording medium (such as an optical disc) which can be inserted into and removed from the digital video recorder 30.

The digital television 20 includes an input unit 21, an HDMI communication unit 23, a 3D video decoding apparatus 100B, a display panel 26, and a transmitter 27.

The input unit 21 receives input video signals 56 included in the broadcast waves 42.

The HDMI communication unit 23 receives output video signals 117 provided by the HDMI communication unit 33, and outputs them as input video signals 57.

The 3D video decoding apparatus 100B generates output video signals 58 by decoding the input video signals 56 or the input video signals 57.

The display panel 26 displays video images which are represented by the output video signals 58 generated by the 3D video decoding apparatus 100B.

The transmitter 27 controls the shutter glasses 43 using wireless communications.

Figure 2:
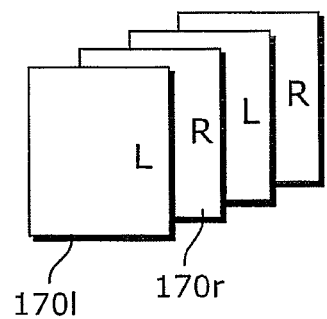
FIG. 2 shows an example of 3D video signals according to the first embodiment of the present invention.

FIG. 2 shows an example of 3D video data. As shown in FIG. 2, the 3D video data includes a left-eye image 170*l* and a right-eye image 170*r* which are alternately disposed.

Figure 3:
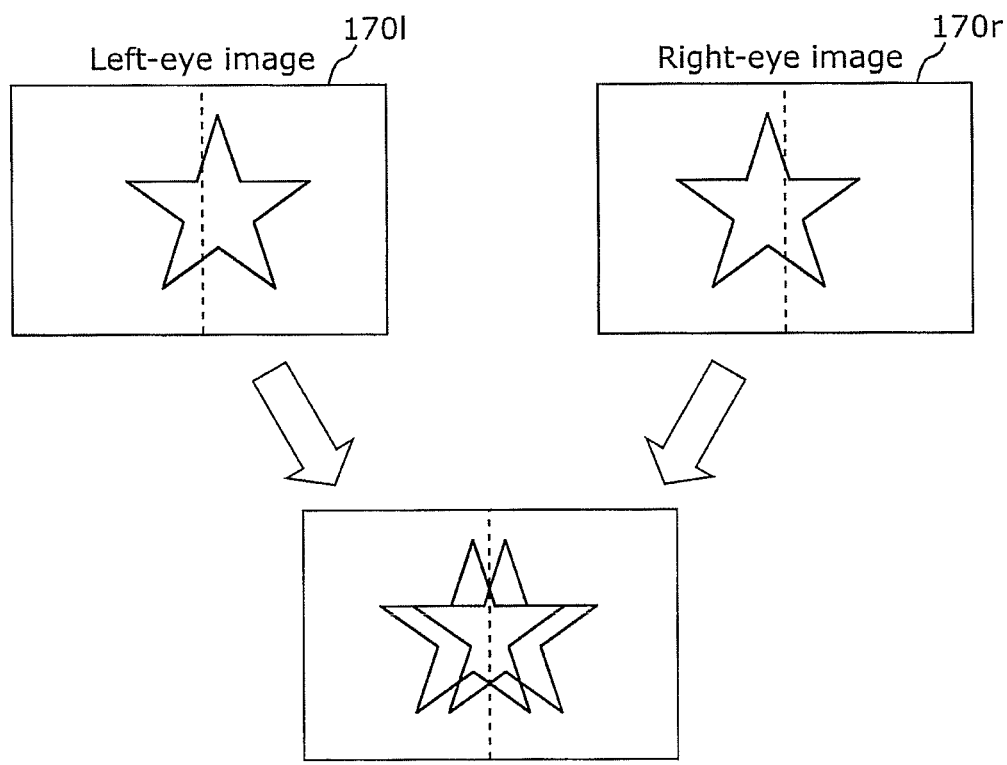
FIG. 3 shows an example of a left-eye image and a right-eye image according to the first embodiment of the present invention.

FIG. 3 shows an example of the left-eye image 170*l* and the right-eye image 170*r*.

As shown in FIG. 3, objects included in the left-eye image 170*l* and the right-eye image 170*r* have a parallax which depends on a distance from an image capturing position to the objects.

The shutter glasses 43 are, for example, liquid crystal shutter glasses worn by a viewer, and include a left-eye liquid crystal shutter and a right-eye liquid crystal shutter. The transmitter 27 controls opening and closing of the left-eye liquid crystal shutter and the right-eye liquid crystal shutter with the same timing of displaying the left-eye image 170*l* and the right-eye image 170*r*. Specifically, the transmitter 27 opens the left-eye liquid crystal shutter of the shutter glasses 43 and closes the right-eye liquid crystal shutter thereof while the left-eye image 170*l* is displayed. Furthermore, the transmitter 27 closes the left-eye liquid crystal shutter of the shutter glasses 43 and opens the right-eye liquid crystal shutter thereof while the right-eye image 170*r* is displayed. Thus, the left-eye image 170*l* and the right-eye image 170*r* selectively and respectively enter the left eye and the right eye of the viewer.

It is to be noted that the method of selectively presenting the left-eye image 170*l* and the right-eye image 170*r* respectively to the left eye and the right eye of the viewer is not limited to the method described above, and a method other than the above may be used.

Figure 4:
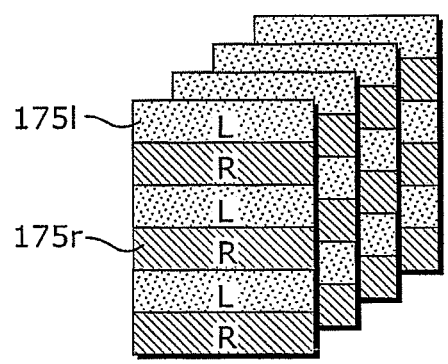
FIG. 4 shows another example of the 3D video signals according to the first embodiment of the present invention.

For example, as shown in FIG. 4, left-eye lines 175*l* and right-eye lines 175*r* are arranged in a stripe pattern within each picture of the 3D video data In this case, the display panel 26 includes a left-eye polarizing film formed on a left-eye pixel and a right-eye polarizing film formed on a right-eye pixel so that the left-eye lines 175*l* and the right-eye lines 175*r* are subject to different polarizations (linear polarization, circular polarization, or the like). The shutter glasses 43 can be replaced by polarized glasses having a left-eye polarizing filter and a right-eye polarizing filter which correspond to the above respective polarizations, so that the left-eye lines 175*l* and the right-eye lines 175*r* enter the left eye and the right eye, respectively, of the viewer.

The arrangement pattern of the left-eye video images and the right-eye video images in the 3D video data may be other than the horizontally striped pattern. For example, the left-eye video images and the right-eye video images may be arranged in a vertical stripe pattern within each picture. Alternatively, the left-eye video images and the right-eye video images may be arranged in a checkered pattern within one picture. Alternatively, the left-eye image 170*l* and the right-eye image 170*r* may be arranged vertically or horizontally side by side within one picture.

The 3D video decoding apparatus 100 according to the first embodiment of the present invention is described in detail below.

Figure 5:
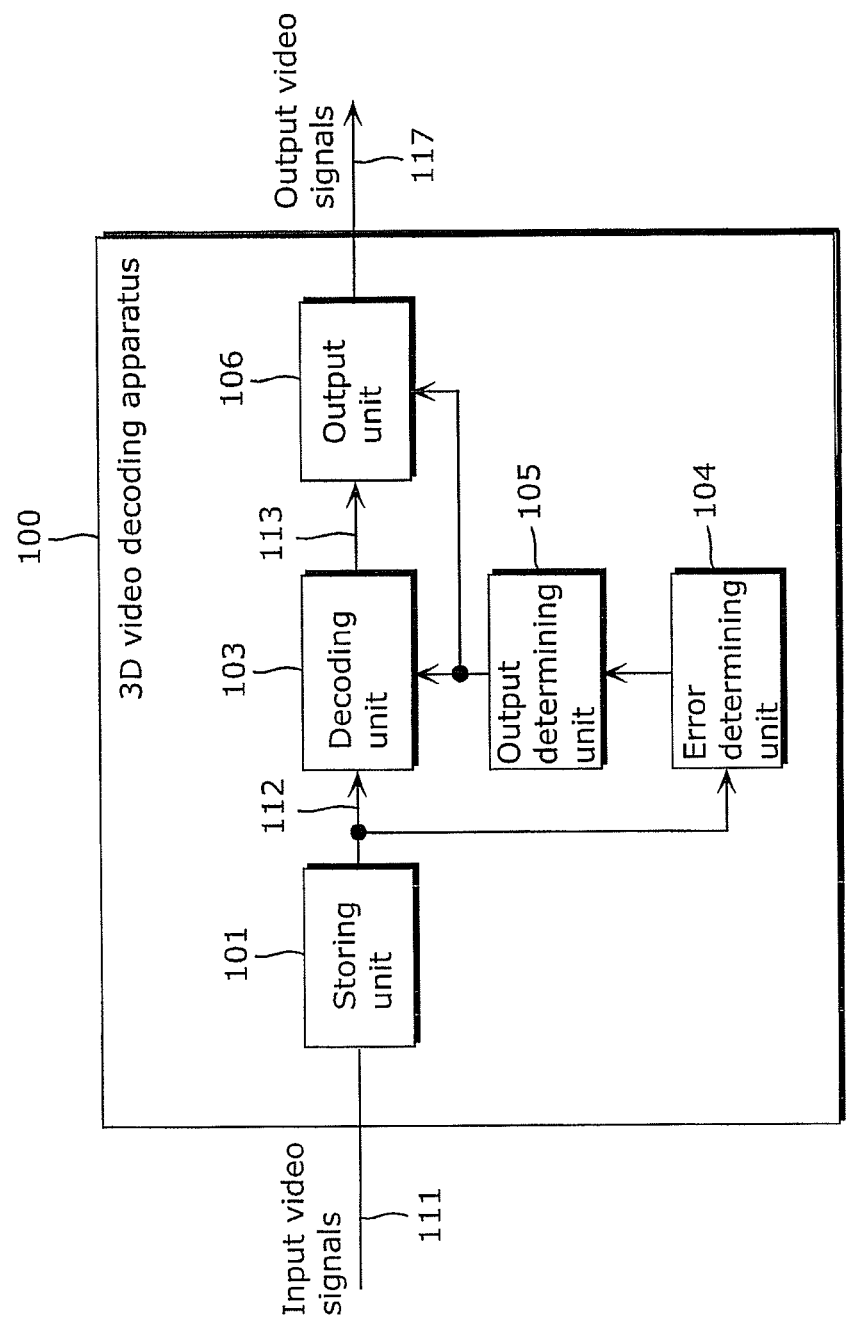
FIG. 5 is a block diagram showing a structure of a 3D video decoding apparatus according to the first embodiment of the present invention.

FIG. 5 is a block diagram showing a structure of the 3D video decoding apparatus 100 according to the first embodiment of the present invention. This 3D video decoding apparatus 100 includes a storing unit 101, a decoding unit 103, an error determining unit 104, an output determining unit 105, and an output unit 106.

The storing unit 101 stores the input video signals 111 and outputs them as input video signals 112.

A structure of the input video signal 112 (111) is described below.

For example, the input video signal 112 is stream data in compliance with the H.264 MVC (multiview video coding)—Blu-ray disc (BD) three-dimensional (3D) standard.

Figure 6:
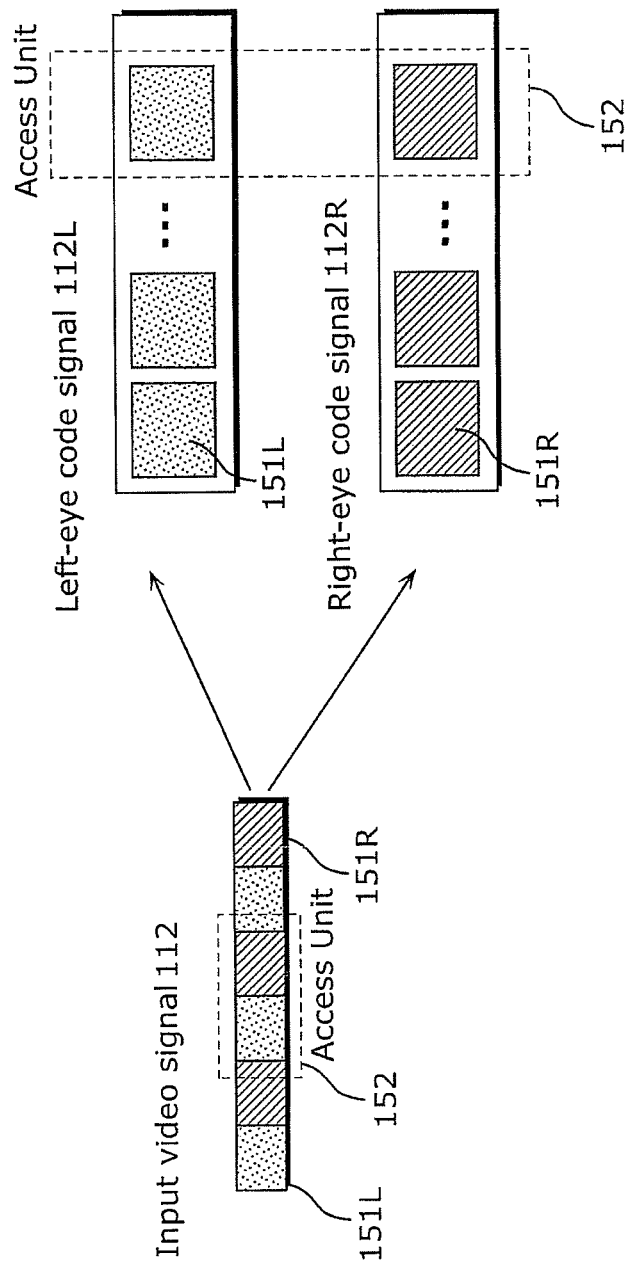
FIG. 6 shows a structure of an input video signal according to the first embodiment of the present invention.

FIG. 6 shows a structure of the input video signal 112.

The input video signal 112 is a transport stream (MPEG-2 TS) and includes a plurality of TS packets, for example. Each of the TS packets is a left-eye packet 151L obtained by coding a left-eye video signal, or a right-eye packet 151R obtained by coding a right-eye video signal. These left-eye packet 151L and right-eye packet 151R are arranged alternately in the input video signal 112. Furthermore, the left-eye packet 151L and the right-eye packet 151R which correspond to images to be displayed at the same time point form a pair which is referred to as an access unit 152.

The images to be displayed at the same time point are, for example, images which are given the same presentation time stamp (PTS). It is to be noted that, in the case where the left-eye image 170*l* and the right-eye image 170*r* are displayed alternately on the display panel 26 as described above, the images with the same PTS are displayed not at the same time but successively.

In addition, each of the TS packets is given an identifier which indicates whether the packet is the left-eye packet 151L or the right-eye packet 151R. Thus, the 3D video decoding apparatus 100 identifies, by referring to the identifier, a left-eye code signal 112L (the left-eye packet 151L) that is obtained by coding a video signal of the first view and is included in the input video signal 112, and a right-eye code signal 112R (the right-eye packet 151R) that is obtained by coding a video signal of the second view different from the first view and is included in the input video signal 112.

Figure 7:
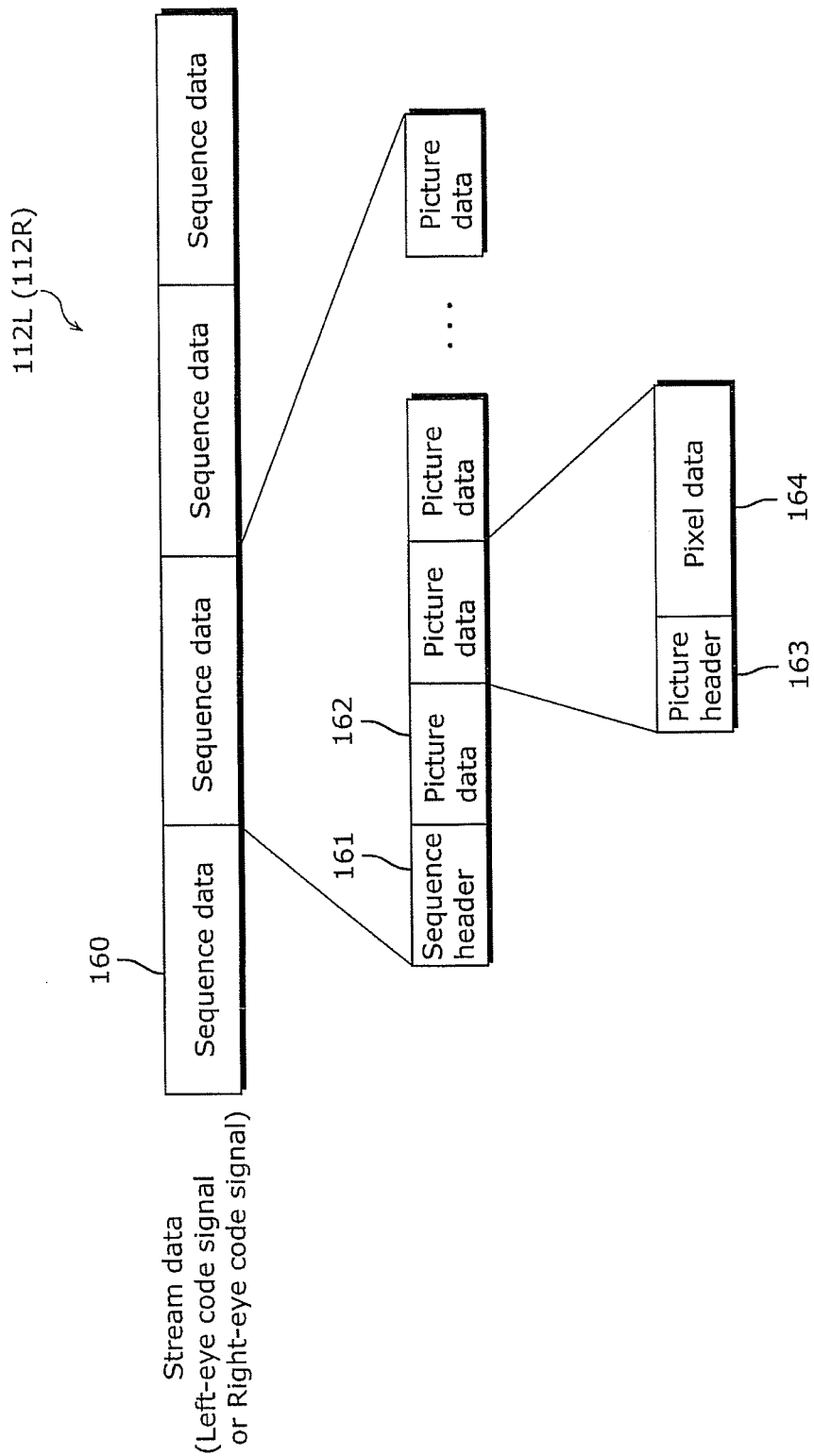
FIG. 7 shows a structure of a left-eye code signal according to the first embodiment of the present invention.

FIG. 7 shows a structure of the left-eye code signal 112L. The right-eye code signal 112R has the same or like structure.

The left-eye code signals 112L include a plurality of sequence data 160. The sequence indicates a unit equivalent to a group of pictures (GOP) in the MPEG-2 standard.

The sequence data 160 includes a sequence header 161 and a plurality of picture data 162. The sequence header 161 includes control information which is common to the plurality of picture data 162 included in the corresponding sequence data 160.

Each of picture data 162 includes a picture header 163 and pixel data 164. The picture header 163 includes control information on the pixel data 164 included in the corresponding picture data 162. The pixel data 164 is data obtained by coding data of a single picture (which is hereinafter referred to also as a coded picture).

It is to be noted that each of the TS packets shown in FIG. 6 is fixed-length data and corresponds to part of one piece of the picture data 162 or corresponds to one or more pieces of the picture data 162.

With reference to FIG. 5 again, further description is set forth below.

The decoding unit 103 generates a left-eye decode signal 113L by decoding the left-eye code signal 112L. Furthermore, the decoding unit 103 generates a right-eye decode signal 113R by decoding the right-eye code signal 112R. The decoding unit 103 then outputs decoded video signals 113 including the left-eye decode signal 113L and the right-eye decode signal 113R.

The left-eye code signal 112L is a base view that is decoded using the left-eye code signal 112L only. The right-eye code signal 112R is an independent view that is decoded using the right-eye code signal 112R and the left-eye code signal 112L.

Specifically, the decoding unit 103 generates quantized coefficients by variable-length decoding of the left-eye code signal 112L and the right-code signal 112R. Next, the decoding unit 103 generates orthogonal transform coefficients (DCT coefficients) by inverse quantizing the generated quantized coefficients. Next, the decoding unit 103 generates prediction errors by inverse orthogonal transforming the generated orthogonal transform coefficients. In the meantime, the decoding unit 103 generates a predictive picture by motion compensation using a decoded reference picture. Next, the decoding unit 103 generates a decoded picture (decoded video signals 113) by adding up the generated prediction errors and predictive picture. Furthermore, the decoding unit 103 stores, into a memory unit, the generated decoded picture as a reference picture which is to be used in a decoding process of a succeeding picture.

Figure 8:
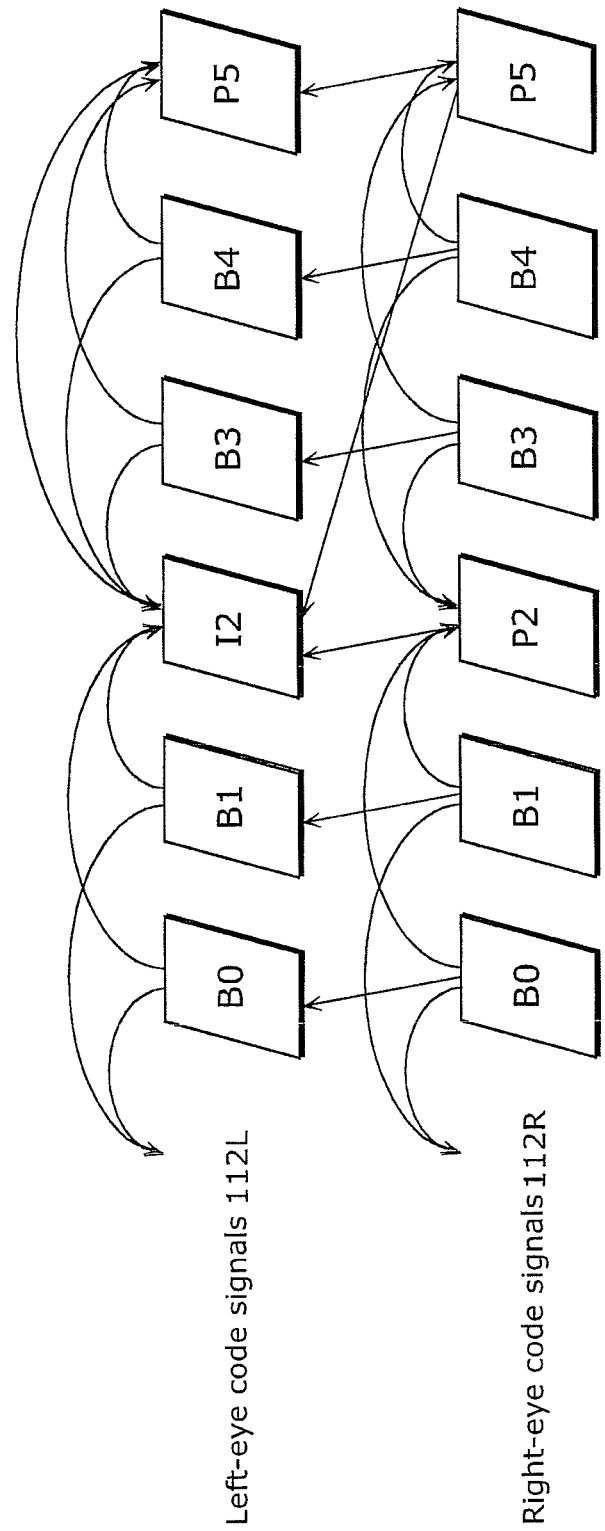
FIG. 8 shows a picture reference relation according to the first embodiment of the present invention.

FIG. 8 shows a reference relation in decoding of coded pictures.

The left-eye code signals 112L and the right-eye code signals 112R include coded I-pictures, coded P-pictures, and coded B-pictures. The coded I-picture, the coded P-picture, and the coded B-picture are coded pictures obtained by coding an I-picture, a P-picture, and a B-picture, respectively. The I-picture is a picture coded using data within the picture itself only. The P-picture and the B-pictures are pictures coded using another I-picture or P-picture.

In other words, the coded I-picture is decoded using data within the coded picture itself only. The coded P-picture and the coded B-picture are decoded using data within the coded pictures themselves and data within other decoded pictures. In the following description, the use of the decoded picture as a reference picture may be referred to as referring to the decoded picture.

In FIG. 8, the coded picture 12 is the coded I-picture, the coded pictures P2 and P5 are the coded P-pictures, and the coded pictures B0, B1, B3, and B4 are the coded B-pictures. In addition, an arrow shown in FIG. 8 indicates a decoded picture to which each of the coded pictures refers.

As shown in FIG. 8, the coded P-pictures and coded-B pictures included in the left-eye code signals 112L refer to only the decoded I-pictures and decoded P-pictures included in the left-eye decode signals 113L. The coded P-pictures and coded B-pictures included in the right-eye code signals 112R refer to the decoded I-pictures and decoded P-pictures included in the right-eye decode signals 113R, and the decoded pictures included in the same access unit 152 as the coded picture among the decoded pictures included in the left-eye decode signals 113L. For example, in the example shown in FIG. 8, the coded picture P2 included in the right-eye code signals 112R refers to the decoded picture 12 included in the same access unit as the coded picture P2.

While the left-eye decode signal 113L is basically referred to by the right-eye code signal 112R within the same access unit 152 as above, such a reference within the access unit 152 is not carried out when there is a large difference in video images between the left-eye decode signals 113L and the right-eye decode signals 113R. In addition, the reference is basically carried out only within the access unit 152. This means that the coded picture in the right-eye code signals 112R does not refer to the decoded picture in the left-eye decode signals 113L which is included in a different access unit 152.

Thus, the decoding unit 103 decodes the left-eye code signals 112L with reference to the decoded left-eye decode signals 113L only. Furthermore, the decoding unit 103 decodes the right-eye code signals 112R with reference to the decoded left-eye decode signals 113L and right-eye decode signals 113R.

The error determining unit 104 determines whether or not the decoding unit 103 can correctly decode the left-eye code signals 112L and whether or not the decoding unit 103 can correctly decode the right-eye code signals 112R. Specifically, the error determining unit 104 determines whether or not the decoding unit 103 can correctly decode the respective coded pictures included in the left-eye code signals 112L and the right-eye code signals 112R. That is, the error determining unit 104 determines whether or not the input video signals 112(111) include data loss or corruption (which is hereinafter referred to as an error) due to scratches or dirt on a BD disc etc., a packet loss by a distribution error in the network, and the like causes.

For example, the error determining unit 104 determines that there is an error in the video signals, when one of the left-eye code signal 112L and the right-eye code signal 112R lacks data of a picture which corresponds to a picture included in the other of the left-eye code signal 112L and the right-eye code signal 112R, and when a data value and a format are out of predetermined normal ranges. It is to be noted that the error determining unit 104 may perform the error determination on a per picture basis and may also perform it based on other units (e.g., for each slice, macroblock, or set of multiple pictures).

The output determining unit 105 determines whether to skip (i.e., not output) both the left-eye decode signal 113L and the right-eye decode signal 113R or to output only the decode signal in which there is no error, when the error determining unit 104 determines that there is an error in only one of the left-eye code signal 112L and the right-eye code signal 112R which are included in the same access unit 152.

Here, as described above, the right-eye code signal 112R is decoded by referring to the left-eye code signal 112L. Thus, when there is an error in the left-eye code signal 112L, the right-eye code signal 112R may also not be correctly decoded.

The output determining unit 105 therefore determines that both the left-eye decode signal 113L and the right-eye decode signal 113R are to be skipped, when there is an error in the left-eye code signal 112L. When there is an error in the right-eye code signal 112R, the output determining unit 105 determines that only the left-eye decode signal 113L in which there is no error is to be output.

In addition, the output determining unit 105 further determines whether or not the data amount of the right-eye code signal 112R which is determined by the error determining unit 104 as being unable to be correctly decoded (for example, the number of coded pictures with errors) is equal to or greater than the first predetermined threshold. When the number of successive coded pictures with errors (which pictures are hereinafter referred to as error pictures) is smaller than the first threshold, the output determining unit 105 determines that neither the left-eye decode signal 113L nor the right-eye decode signal 113R is to be output, while, when the number of successive error pictures is equal to or greater than the first threshold, the output determining unit 105 determines that only the left-eye decode signal 113L is to be output.

The output unit 106 outputs the left-eye decode signals 113L and the right-eye decode signals 113R as the output video signals 117. However, the output unit 106 does not output any or one of the left-eye decode signal 113L and the right-eye decode signal 113R determined by the output determining unit 105 as being skipped (i.e., not output). Here, skipping indicates not outputting data of a corresponding decoded picture or outputting the same data as the immediately preceding decoded picture in the video signals of the same view.

The decoding unit 103 does not perform the decoding process on the coded picture which corresponds to the decoded picture determined by the output determining unit 105 as being skipped. It may also be possible that the decoding unit 103 performs all or part of the decoding process and the output unit 106 does not perform only the output process.

The following describes a flow of operation of the 3D video decoding apparatus 100.

Figure 9:
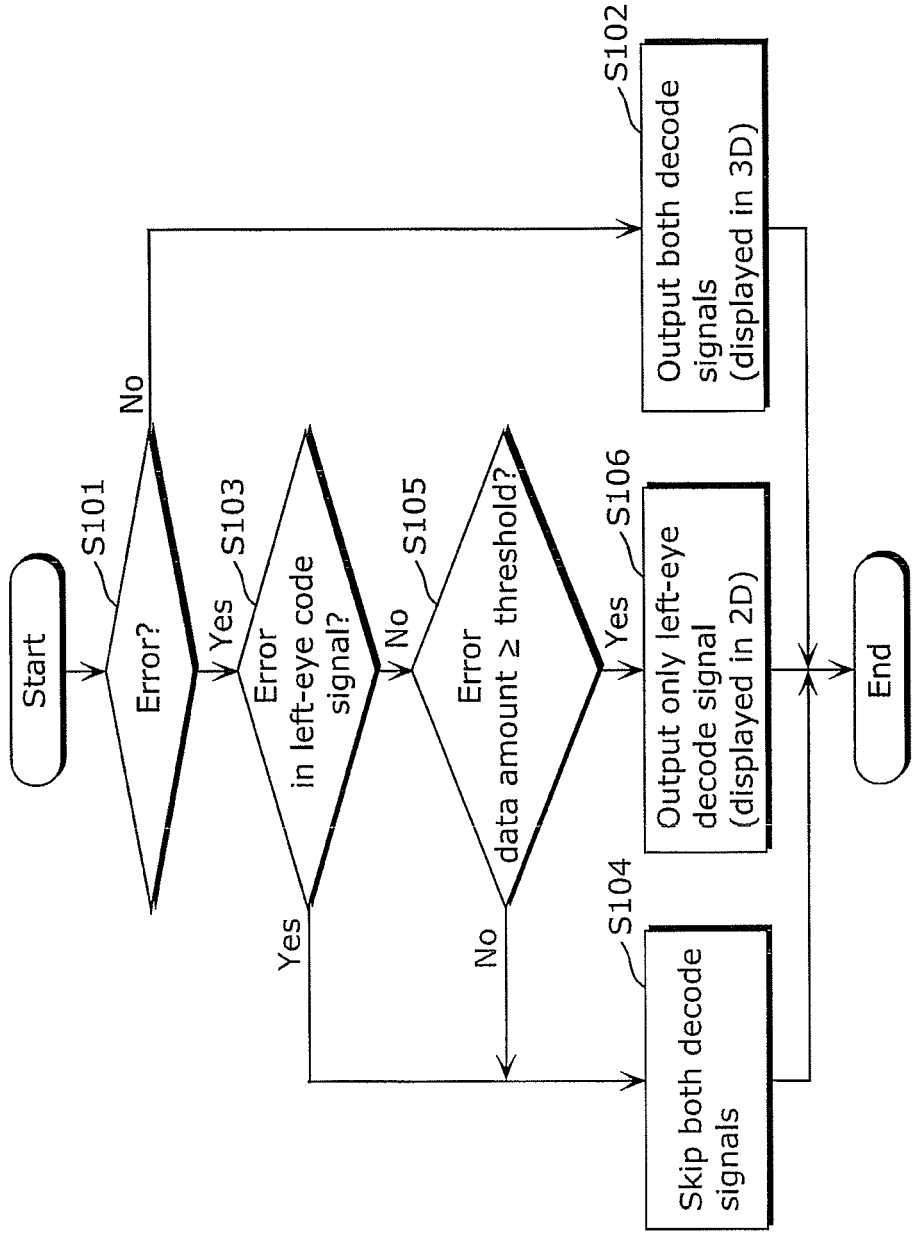
FIG. 9 is a flowchart showing a decoding process of the 3D video decoding apparatus according to the first embodiment of the present invention.

FIG. 9 is a flowchart showing a decoding process of the 3D video decoding apparatus 100.

As shown in FIG. 9, first, the error determining unit 104 determines whether or not there is an error in the input video signals 112 (S101).

Where there is no error (No in S101), the output unit 106 outputs the left-eye decode signals 113L and the right-eye decode signals 113R as the output video signals 117 (S102). This allows the display panel 26 to display the 3D video images.

On the other hand, there is an error in the left-eye code signals 112L (Yes in S101 and Yes in S103), the output unit 106 outputs the output video signals 117 with the left-eye decode signals 113L and the right-eye decode signals 113R skipped (S104). This causes the display panel 26 to display the immediately preceding 3D video images again.

When there is an error in the right-eye code signals 112R (No in S103), then the output determining unit 105 determines whether or not the data mount with the errors is equal to or greater than the first threshold (S105).

The following describes a specific example of the method in which the output determining unit 105 determines an amount of data with errors.

Figure 10:
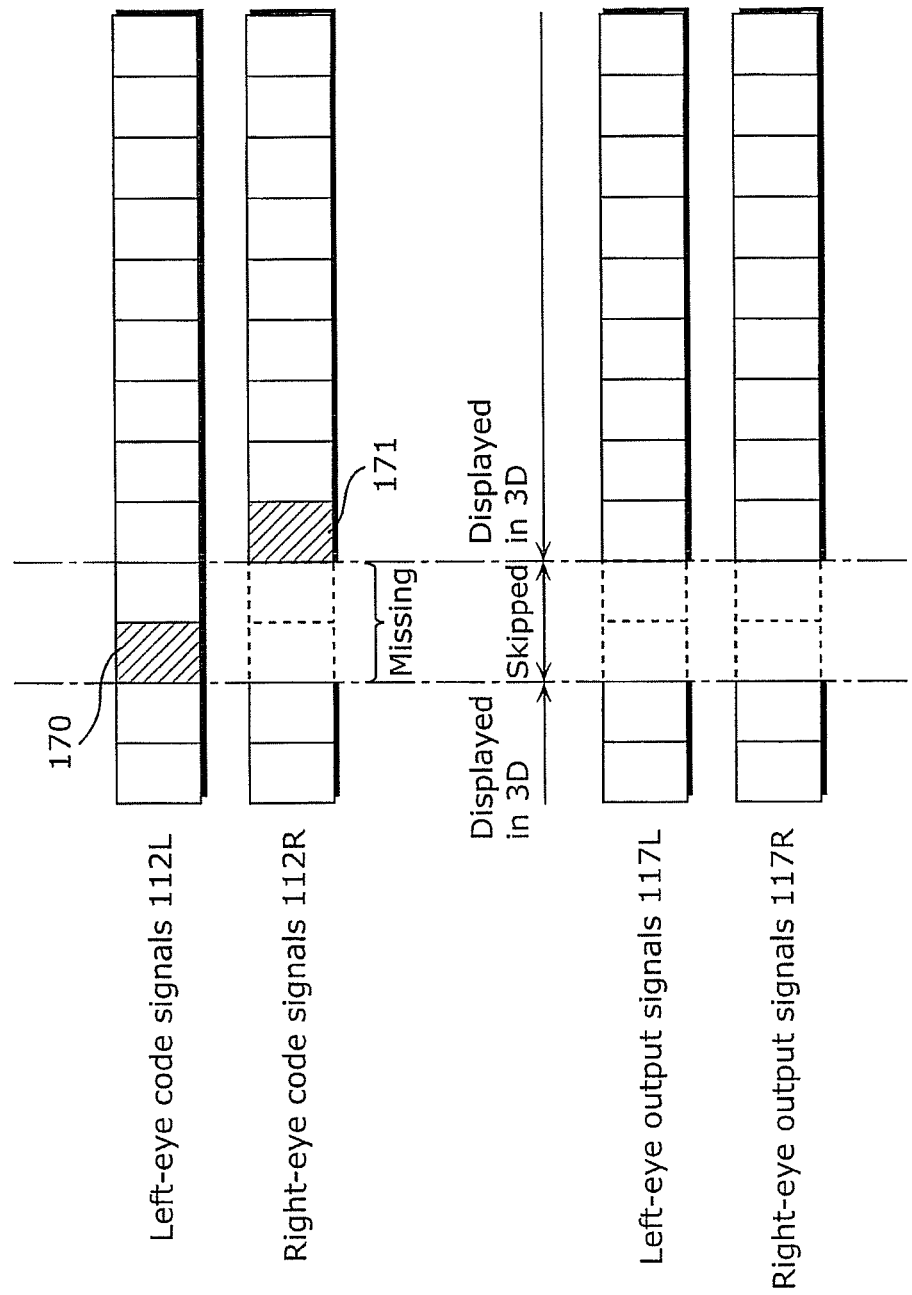
FIG. 10 shows input video signals and output video signals in the case where there is an error in right-eye code signals, in the 3D video decoding apparatus according to the first embodiment of the present invention.
Figure 11:
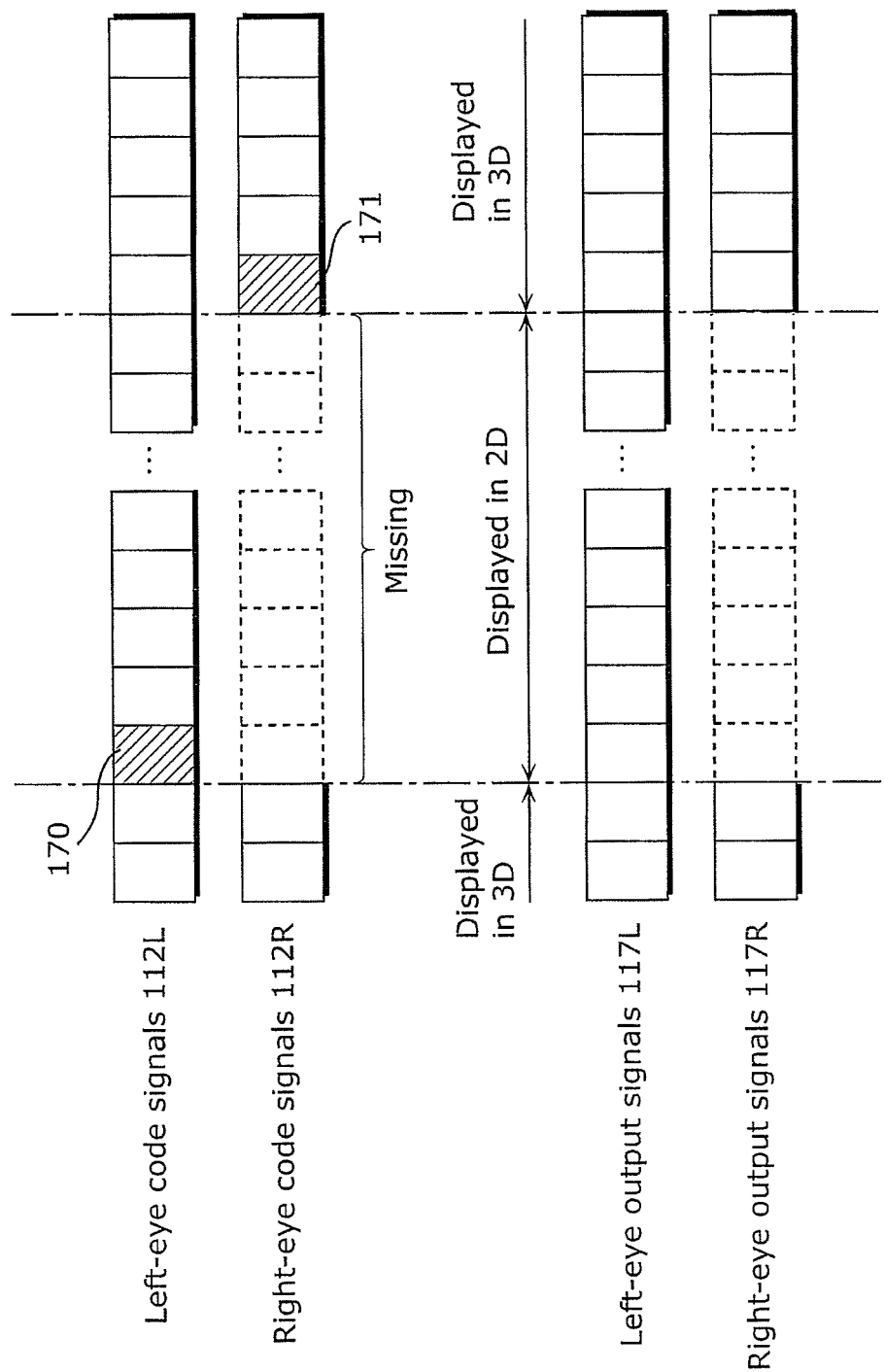
FIG. 11 shows input video signals and output video signals in the case where there is an error in right-eye code signals, in the 3D video decoding apparatus according to the first embodiment of the present invention.

FIGS. 10 and 11 show examples of the input video signals 112 and the output video signals 117 in the case where there is an error in the right-eye code signals 112R. The output video signals 117 include the left-eye output signals 117L and the right-eye output signals 117R. The left-eye output signals 117L correspond to the left-eye decode signals 113L, and the right-eye output signals 117R correspond to the right-eye decode signals 113R.

For example, the output determining unit 105 calculates a difference between the PTS assigned to the initial coded picture 170, not yet decoded, of the left-eye code signals 112L stored in the storing unit 101, and the PTS assigned to the initial coded picture 171, not yet decoded, of the right-eye code signals 112R stored in the storing unit 101. When the calculated difference is equal to or greater than the second threshold, the output determining unit 105 determines that the amount of data with errors is equal to or greater than the first threshold, while, when the calculated difference is smaller than the second threshold, the output determining unit 105 determines that the amount of data with errors is smaller than the first threshold.

With an underflow of the right-eye code signals 112R, the output determining unit 105 may determine that the amount of data with errors is equal to or greater than the first threshold.

It may also be possible that the output determining unit 105 performs the same or like determination using the left-eye decode signals 113L and the right-eye decode signals 113R stored in a memory unit (not shown) in which the decoded video signals 113 are stored.

As shown in FIG. 10, when the amount of data with errors is smaller than the first threshold (No in S105), the output video signals 117 are output with the left-eye decode signals 113L and the right-eye decode signals 113R skipped (S104).

On the other hand, as shown in FIG. 11, when the amount of data with errors is equal to or greater than the first threshold (Yes in S105), the output video signals 117 are output with the left-eye decode signals 113L included and the right-eye decode signals 113R skipped (S106). This causes the display panel 26 to display only the left-eye image 170*l* in 2D.

Although not shown in FIG. 9, when there are errors in both the left-eye code signals 112L and the right-eye code signals 112R, the output determining unit 105 outputs the output video signals 117 with the left-eye decode signals 113L and the right-eye decode signals 113R skipped.

As above, the 3D video decoding apparatus 100 according to the first embodiment of the present invention maintains the 3D presentation by skipping both the left-eye image and the right-eye image when the amount of data with errors is smaller than the first threshold. This allows the 3D video decoding apparatus 100 to prevent an instantaneous change from 3D to 2D presentation when the amount of data with errors is small. Thus, the 3D video decoding apparatus 100 is capable of generating favorable video images when there is an error.

Furthermore, the 3D video decoding apparatus 100 according to the first embodiment of the present invention provides the 2D presentation when the amount of data with errors is equal to or greater than the first threshold. This allows the 3D video decoding apparatus 100 to avoid a long video freeze when the amount of data with errors is large. Thus, the 3D video decoding apparatus 100 is capable of generating favorable video images when there is an error.

Furthermore, the 3D video decoding apparatus 100 according to the first embodiment of the present invention skips both the left-eye decode signal 113L and the right-eye decode signal 113R when there is an error in the left-eye code signal 112L. This makes it possible to prevent the error occurred in the left-eye code signal 112L to pass on to the right-eye decode signal 113R that is generated with reference to the left-eye decode signal 113L. Furthermore, the 3D video decoding apparatus 100 provides the 2D presentation when there is an error in the right-eye code signal 112R. This allows the 3D video decoding apparatus 100 to avoid frequent freezes of video. Thus, the 3D video decoding apparatus 100 is capable of generating favorable video images when there is an error.

While the above description gives an example where the left-eye code signals 112L serve as a base view and the right-eye code signals 112R serve as a dependent view, it may also be possible that the right-eye code signals 112R serve as a base view and the left-eye code signals 112L serve as a dependent view.

Furthermore, while the above description gives an example where the 3D video decoding apparatus 100 processes the respective left-eye and right-eye video images of the two views, it may process video images of three or more views. That is, there may be a plurality of dependent views.

Furthermore, while the above description gives an example where the right-eye code signal 112R is decoded with reference to the left-eye decode signal 113L, the right-eye code signal 112R and the left-eye code signal 112L may be signals which are decoded with reference to their own decode signals only. Even in this case, the same effects as above can be obtained by switching, according to the amount of data with errors, between skipping of both the decode signals and outputting of only the decode signal with no error.

Furthermore, the order of the processes shown in FIG. 9 is an example, and the respective steps may be performed in other orders. For example, the determining process of Step S103 and the determining process of Step S105 may be replaced in the order or may partially be performed at the same time.

Second Embodiment

The first embodiment has described the processing of the 3D video decoding apparatus 100 mainly in the case where there is a loss of data which corresponds to a plurality of pictures. The second embodiment of the present invention describes the operation of the 3D video decoding apparatus 100 mainly in the case where there is an error in data of a single coded picture due to dirt, scratches, and the like on BD discs.

Figure 12:
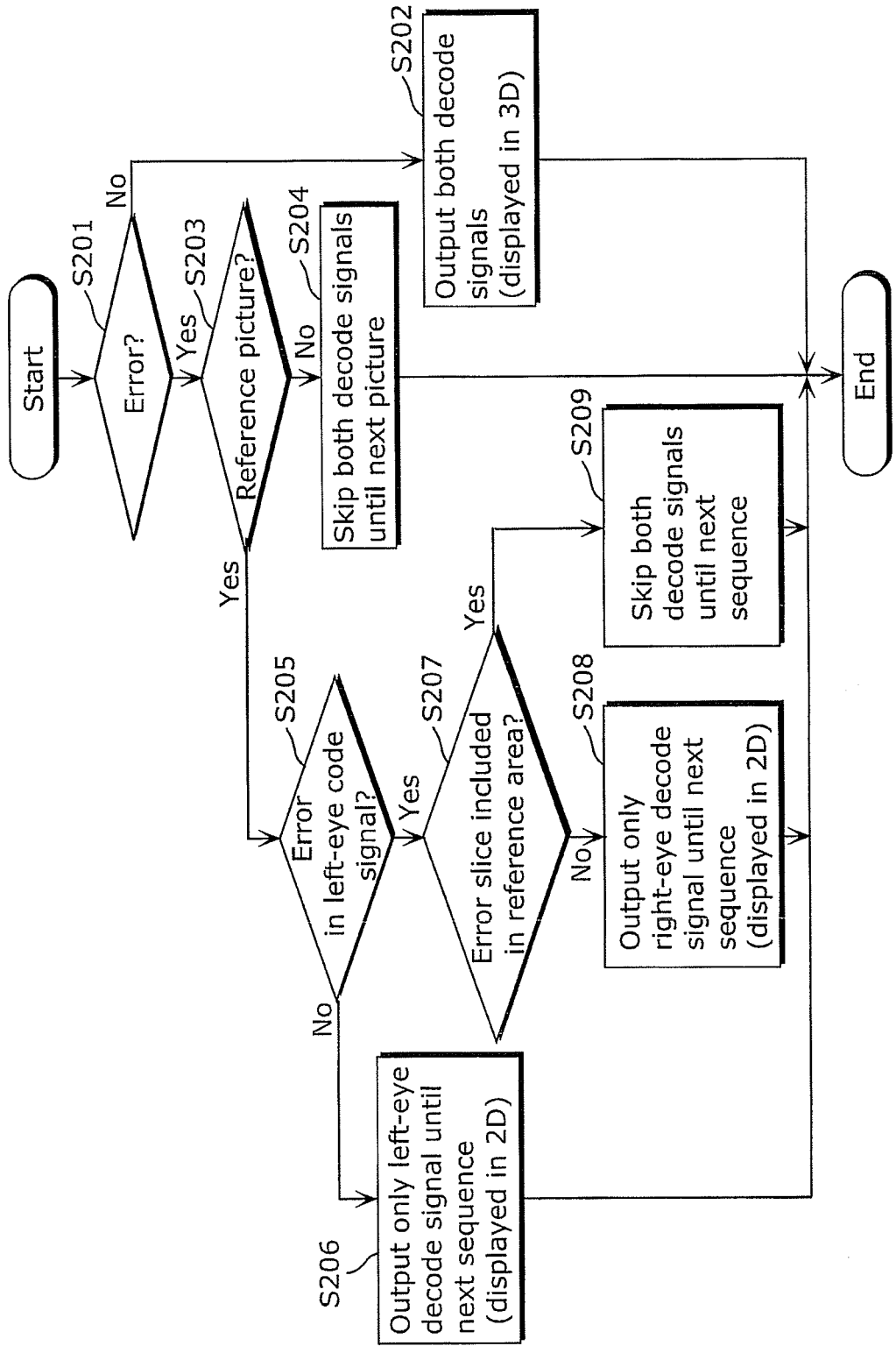
FIG. 12 is a flowchart showing a decoding process of a 3D video decoding apparatus according to the second embodiment of the present invention.

FIG. 12 is a flowchart showing a decoding process of the 3D video decoding apparatus 100 according to the second embodiment of the present invention.

As shown in FIG. 12, first, the error determining unit 104 determines whether or not there is an error in the input video signals 112 (S201). Here, the error determining unit 104 determines the error on a per coded picture basis and at the same time, determines, for each of the slices included in the error picture, whether or not the slice can be correctly decoded. It is to be noted that the error determining unit 104 may determine, for each of subregions (e.g., one or more macroblocks), except for the slices, of the coded picture, whether or not the subregion can be correctly decoded.

Where there is no error (No in S201), the output unit 106 outputs the left-eye decode signals 113L and the right-eye decode signals 113R as the output video signals 117 (S202). This allows the display panel 26 to display the 3D video images.

On the other hand, there is an error (Yes in S201), then the output determining unit 105 determines whether the coded picture with the error is a reference coded picture or a non-reference coded picture (S203). The reference coded picture indicates a coded picture which is decoded to generate a decoded picture which is referred to when the decoding unit 103 decodes another coded picture included in the video signals of the same view, and is specifically the coded I picture and the coded P picture. The non-reference coded picture indicates a coded picture which is decoded to generate a decoded picture which is not referred to when the decoding unit 103 decodes another coded picture included in the video signals of the same view, and is specifically the coded B picture.

Figure 13:
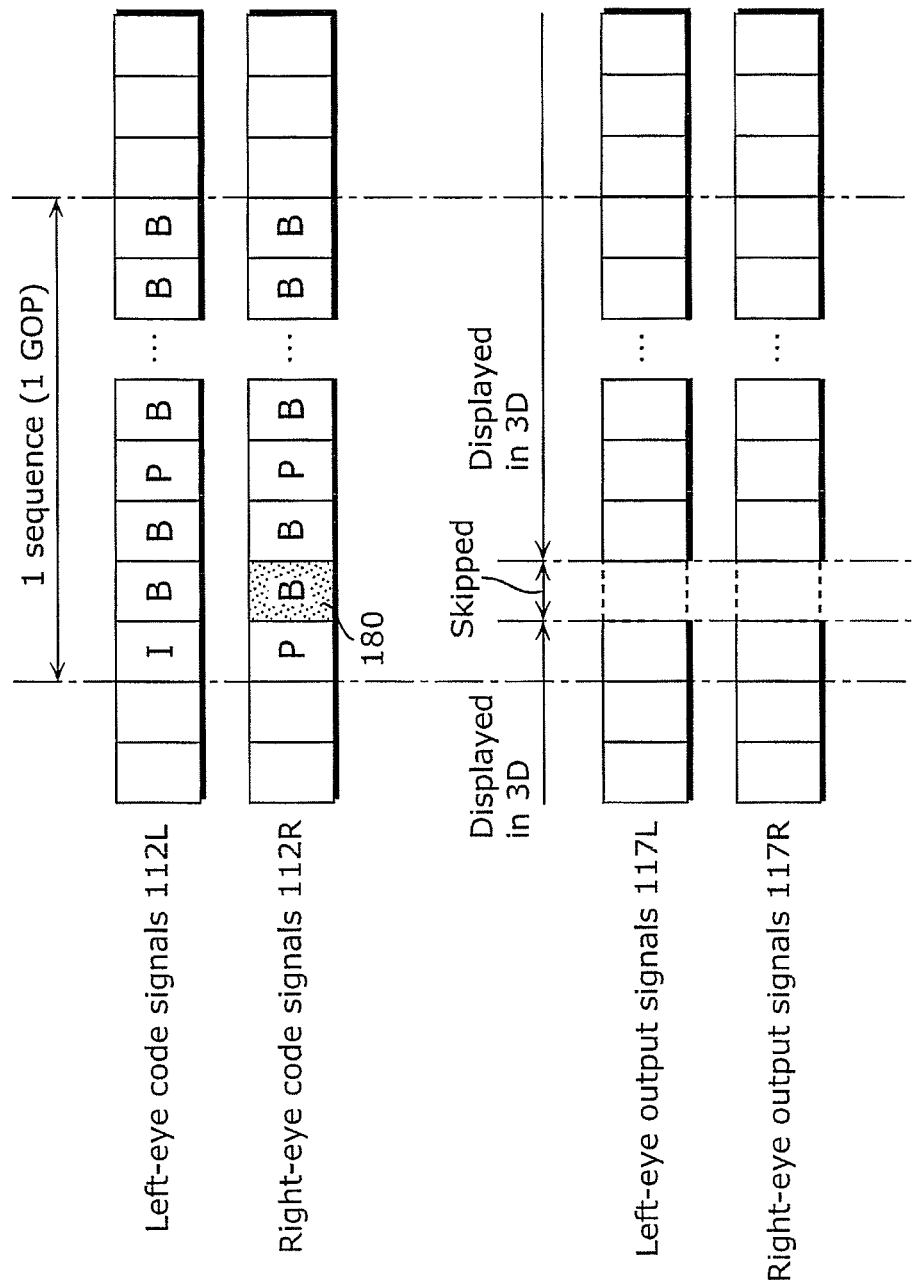
FIG. 13 shows input video signals and output video signals in the case where there is an error in a non-reference coded picture, in the 3D video decoding apparatus according to the second embodiment of the present invention.

FIG. 13 shows an example of the input video signals 112 and the output video signals 117 in the case where there is an error in the non-reference coded picture (an error picture 180).

As shown in FIG. 13, when there is an error in the non-reference coded picture, the output unit 106 outputs the output video signals 117 with the left-eye decode signals 113L and the right-eye decode signals 113R skipped until the next decoded picture (S204). In other words, the output unit 106 skips an error decoded picture corresponding to the error picture, and a decoded picture which is included in the same access unit 152 as the error decoded picture and included in the video signals of the other views.

On the other hand, when there is an error in the reference coded picture (Yes in S203), then the output determining unit 105 determines which, of the left-eye code signal 112L and the right-eye code signal 112R, includes the error (S205).

When there is an error in the reference coded picture, referring to the error decoded picture by a succeeding picture may cause propagation of the error. The output determining unit 105 therefore skips the decoded pictures until the next sequence, when the reference coded picture includes an error.

Figure 14:
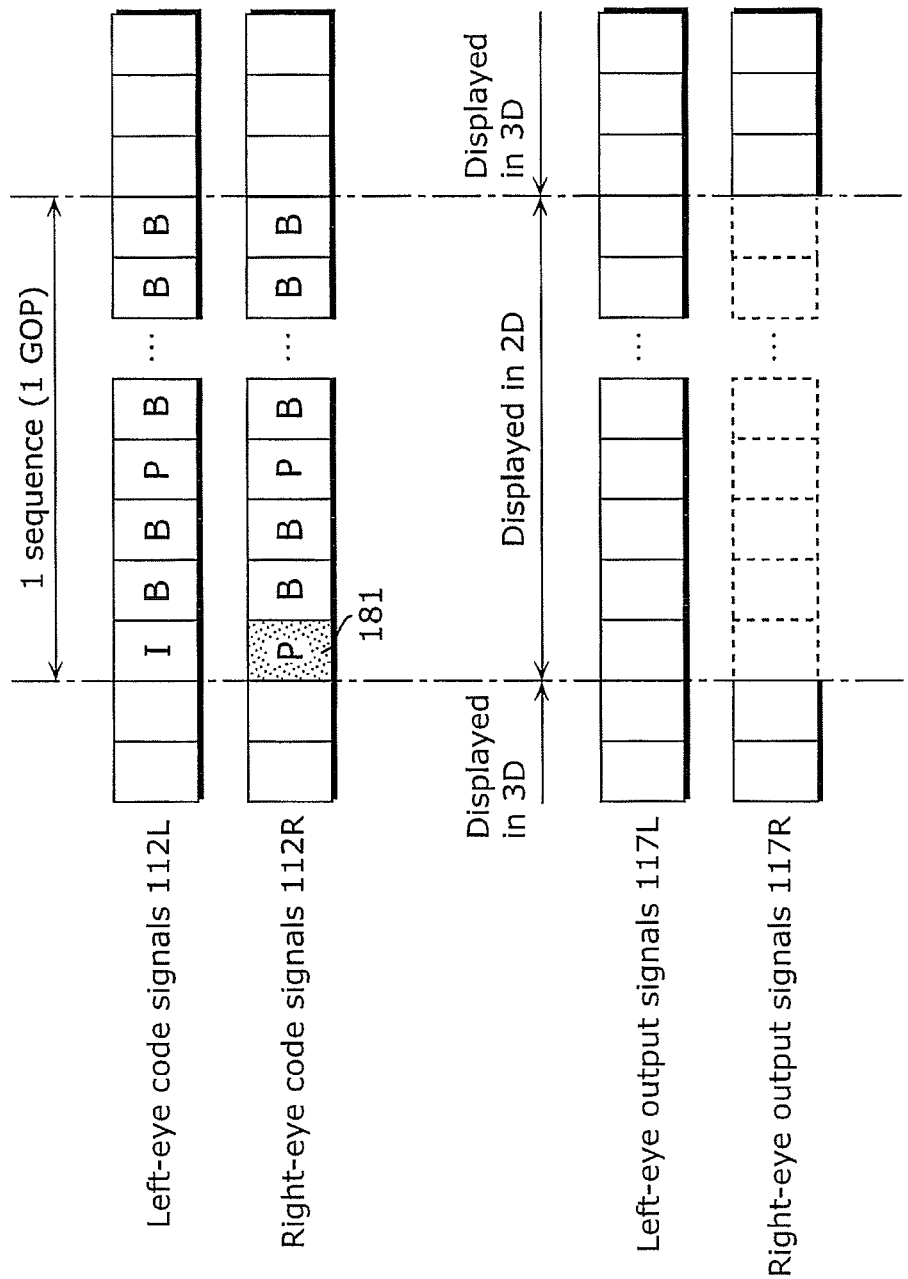
FIG. 14 shows the input video signals and the output video signals in the case where there is an error in a reference coded picture of right-eye code signals, in the 3D video decoding apparatus according to the second embodiment of the present invention.

FIG. 14 shows an example of the input video signals 112 and the output video signals 117 in the case where there is an error in the reference coded picture (an error picture 181) of the right-eye code signals 112R.

As shown in FIG. 14, when there is an error in the reference coded picture of the right-eye code signals 112R (No in S205), the output unit 106 outputs the output video signals 117 with the right-eye decode signals 113R skipped until the next sequence (S206).

On the other hand, when there is an error in the reference coded picture of the left-eye code signals 112L (Yes in S205), then the output determining unit 105 determines whether or not the slice with the error (which slice is hereinafter referred to as an error slice) is included in a reference area 187 of the coded picture, included in the same access unit 152 as the error picture, of the right-eye code signals 112R (S207).

Figure 15:
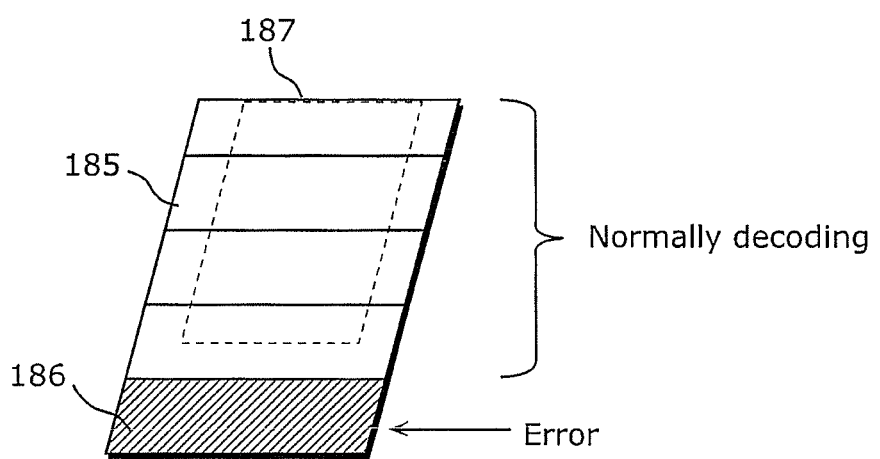
FIG. 15 shows a relation between an error slice and a reference area according to the second embodiment of the present invention.

FIG. 15 shows a relation between an error slice 186 and the reference area 187. The reference area 187 is an area which is associated with each of the coded pictures included in the right-eye code signals 112R and is located inside the decoded picture of the left-eye decode signals 113L which is referred to by the corresponding coded picture. That is, the reference area 187 is an area inside the error decoded picture which is referred to by the coded picture of the right-eye code signals 112R which is included in the same access unit 152 as the error picture. Reference area designating information indicating this reference area 187 is included in the input video signals 112. Specifically, this reference area designating information is parallel decoding information SEI in the H.264 MVC standard.

The decoding unit 103 decodes the coded picture included in the right-eye code signals 112R, with reference to the reference area 187 included in the decoded picture of the left-eye code signals 113L which is included in the same access unit 152 as the coded picture.

As shown in FIG. 15, even in the case where there is an error in the left-eye code signals 112L, when the error slice 186 is not included in the reference area 187, in other words, when the reference area 187 includes only normal slices 185 that can be correctly decoded, the coded picture of the right-eye code signals 112R which refers to the error decoded picture can be correctly decoded.

Figure 16:
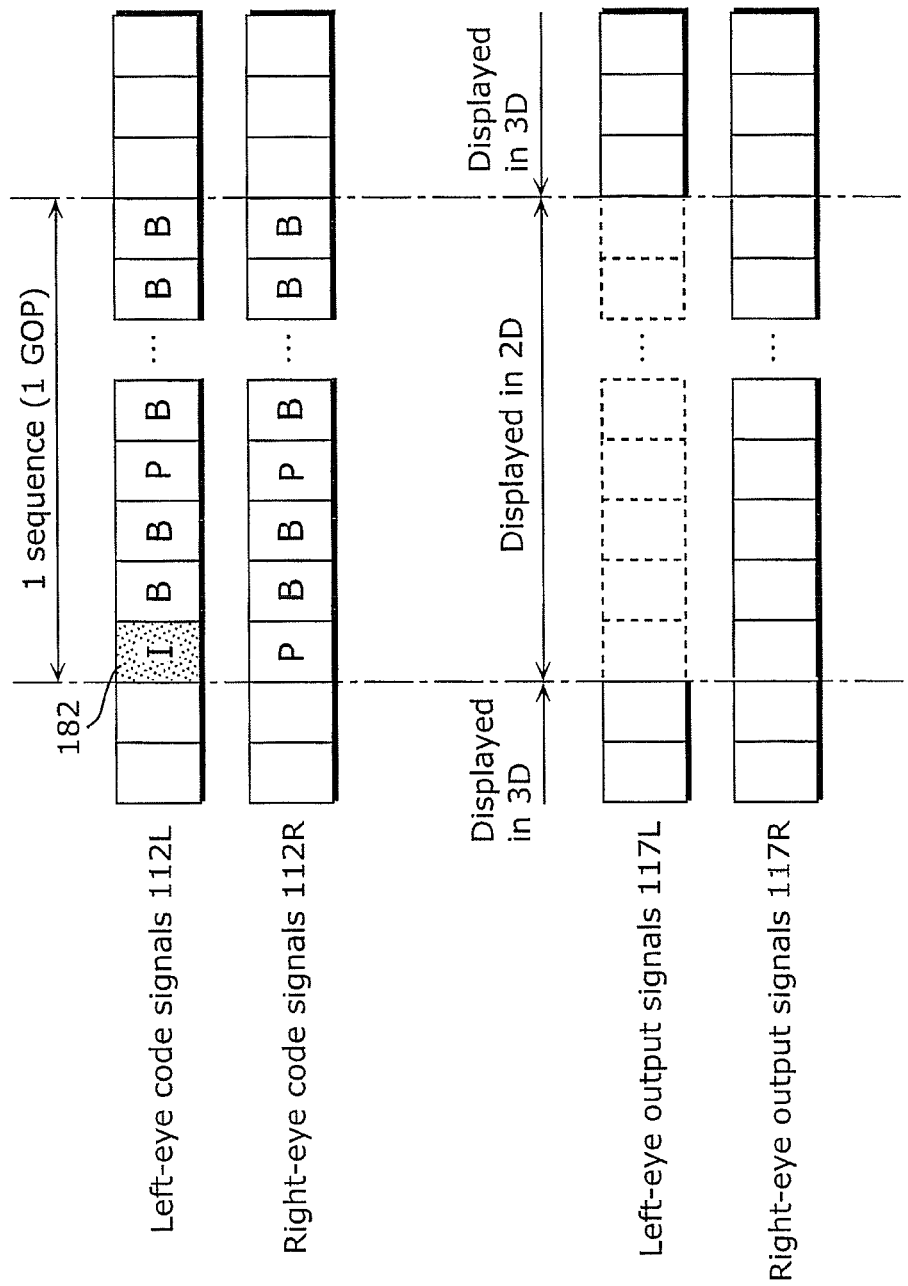
FIG. 16 shows the input video signals and the output video signals in the case where the error slice is not included in the reference area, in the 3D video decoding apparatus according to the second embodiment of the present invention.

FIG. 16 shows an example of the input video signals 112 and the output video signals 117 in the case where the error slice 186 is not included in the reference area 187.

As shown in FIG. 16, when the error slice 186 of the error picture 182 is not included in the reference area 187 (No in S207), the output unit 106 outputs the output video signals 117 with the left-eye decode signals 113L skipped until the next sequence (S208).

Figure 17:
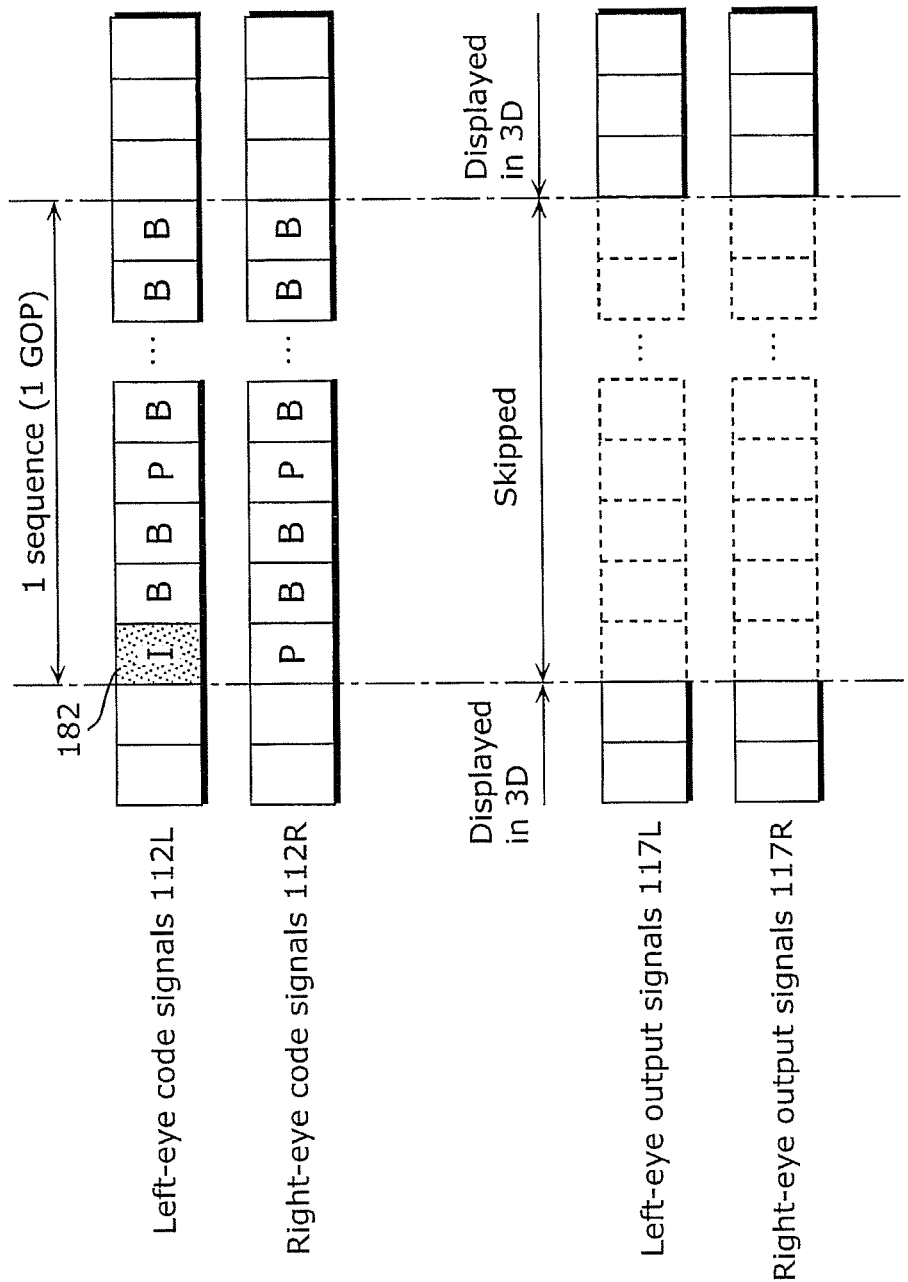
FIG. 17 shows the input video signals and the output video signals in the case where the error slice is included in the reference area, in the 3D video decoding apparatus according to the second embodiment of the present invention.

FIG. 17 shows an example of the input video signals 112 and the output video signals 117 in the case where the error slice 186 is included in the reference area 187.

As shown in FIG. 17, when the error slice 186 of the error picture 182 is included in the reference area 187 (Yes in S207), the output unit 106 outputs the output video signals 117 with both the left-eye decode signals 113L and the right-eye decode signals 113R skipped until the next sequence (S209).

As above, the 3D video decoding apparatus 100 according to the second embodiment of the present invention skips both the left-eye decode signal 113L and the right-eye decode signal 113R when there is an error in the left-eye code signal 112L. This makes it possible to prevent the error occurred in the left-eye code signal 112L to pass on to the right-eye decode signal 113R that is generated with reference to the left-eye decode signal 113L. Furthermore, the 3D video decoding apparatus 100 provides the 2D presentation when there is an error in the right-eye code signal 112R. This allows the 3D video decoding apparatus 100 to avoid frequent freezes of video. Thus, the 3D video decoding apparatus 100 is capable of generating favorable video images when there is an error.

Furthermore, when the error picture is the non-reference coded picture, the 3D video decoding apparatus 100 according to the second embodiment of the present invention skips both the left-eye decode signals 113L and the right-eye decode signals 113R until the next decoded picture. This allows the 3D video decoding apparatus 100 to skip the minimum number of pictures. When the error picture is the reference coded picture, the 3D video decoding apparatus 100 skips both the left-eye decode signals 113L and the right-eye decode signals 113R or the decode signals with the errors until the next sequence. This allows the 3D video decoding apparatus 100 to prevent the error from passing on to a succeeding decoded picture.

Furthermore, when skipping until the next decoded picture, the 3D video decoding apparatus 100 according to the second embodiment of the present invention skips both the respective-eye decode signals. This allows the 3D video decoding apparatus 100 to prevent video from being displayed in 2D only for a moment. When skipping decoding until the next sequence, the 3D video decoding apparatus 100 provides the 2D presentation. This allows the 3D video decoding apparatus 100 to avoid a long freeze of video.

Furthermore, even in the case where there is an error in the left-eye code signals 112L, the 3D video decoding apparatus 100 according to the second embodiment of the present invention outputs only the right-eye decode signals 113R when the error slice 186 is not included in the reference area 187 to which the corresponding right-eye code signal 112R refers. This allows the 3D video decoding apparatus 100 to avoid frequent freezes of video.

Thus, the 3D video decoding apparatus 100 according to the second embodiment of the present invention is capable of generating favorable video images when there is an error.

While the above describes the 3D video decoding apparatus 100 which selects the decode signals to be output or skipped, according to the result of a plurality of determining processes as described above, the 3D video decoding apparatus 100 may select the decode signals to be output or skipped, according to the result of at least one of the above determining processes.

Specifically, it is sufficient that the 3D video decoding apparatus 100 according to the second embodiment of the present invention performs at least one of the following processes: (i) a process of skipping both the left-eye decode signals 113L and the right-eye decode signals 113R when there is an error in the left-eye code signals 112L, and providing the 2D presentation when there is an error in the right-eye code signals 112R; (ii) a process of skipping both the left-eye decode signals 113L and the right-eye decode signals 113R until the next decoded picture, when the error picture is the non-reference coded picture, and skipping both the left-eye decode signals 113L and the right-eye decode signals 113R or the decode signals with the errors until the next sequence, when the error picture is the reference coded picture; (iii) a process of skipping both the respective-eye decode signals when skipping the signals until the next decoded picture in the above (ii), and providing the 2D presentation when skipping the signals until the next sequence in the above (ii); and (iv) a process of outputting only the right-eye decode signals 113R when the error slice 186 is not included in the reference area 187 to which the corresponding right-eye code signals 112R refer, even when there is an error in the left-eye code signals 112L.

Furthermore, the order of the processes shown in FIG. 12 is an example, and other orders of the processes are applicable as long as they can lead to the same or like effects. Part of the processes may be performed at the same time.

Third Embodiment

A 3D video decoding apparatus 200 according to the third embodiment of the present invention complements the header information which includes an error, using the other header information included in the video signals of the same view or with the header information included in the video signals of a different view.

The 3D video decoding apparatus 200 according to the third embodiment of the present invention can be applied to the 3D video display system 10 shown in FIG. 1, as in the case of the 3D video decoding apparatus 100 according to the first embodiment.

Figure 18:
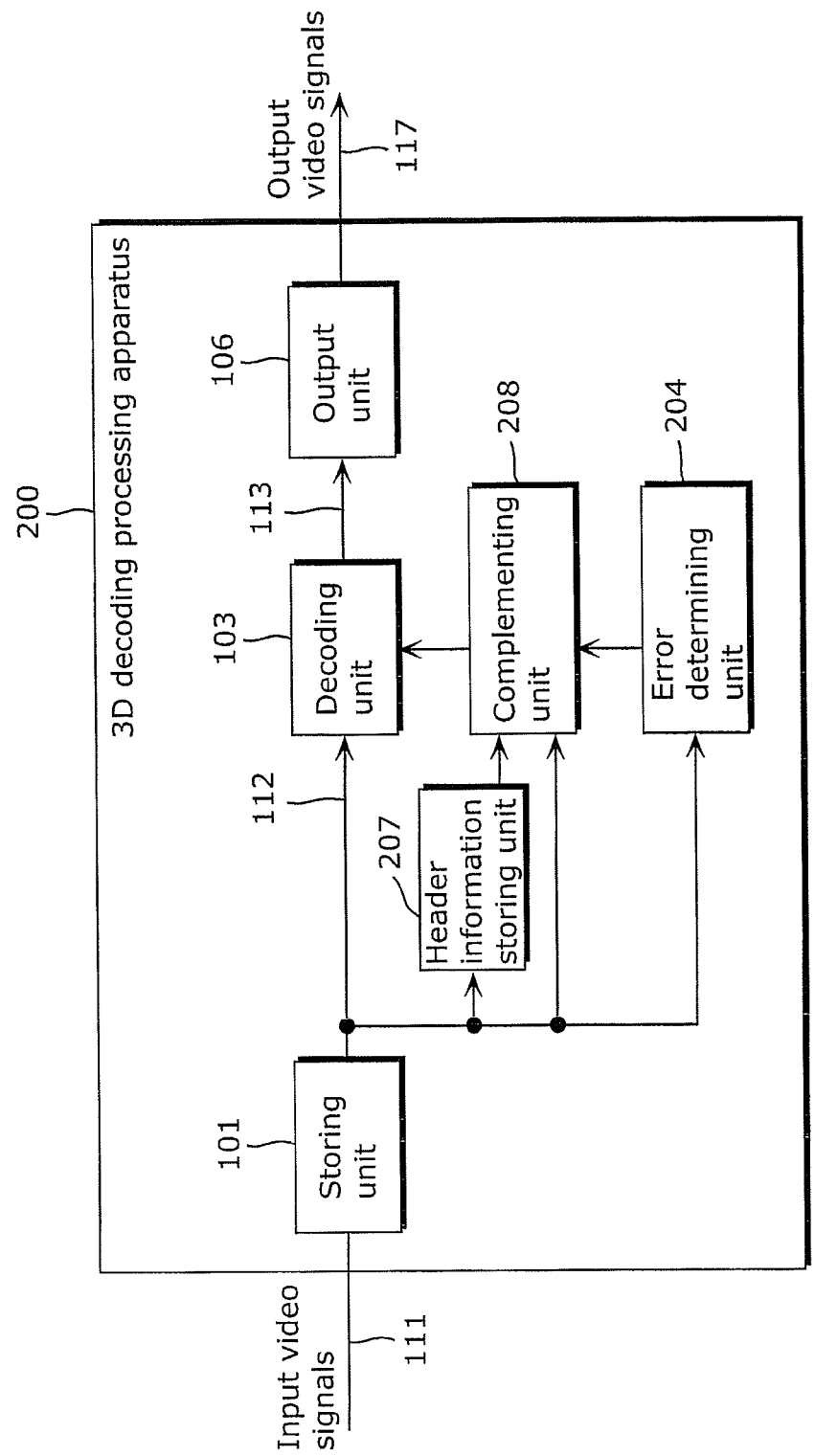
FIG. 18 is a block diagram showing a structure of a 3D video decoding apparatus according to the third embodiment of the present invention.

FIG. 18 is a block diagram showing a structure of the 3D video decoding apparatus 200 according to the third embodiment of the present invention. In the figure, components common with FIG. 5 have the same numerals.

This 3D video decoding apparatus 200 includes the storing unit 101, the decoding unit 103, an error determining unit 204, a header information storing unit 207, and the output unit 106.

The storing unit 101 stores the input video signals 111 and outputs them as the input video signals 112.

The header information storing unit 207 stores header information. The header information is control information which is included in each of the sequence header 161 and the picture header 163 shown in FIG. 7.

The error determining unit 204 determines whether or not the sequence header 161 and the picture header 163 are normal (whether they include errors).

For example, when the sequence header 161 or the picture header 163 is not present and when a data value and a format of the sequence header 161 or the picture header 163 are out of predetermined normal ranges, the error determining unit 204 determines that there is an error in the corresponding one of the sequence header 161 and the picture header 163. Specifically, when a next start code is detected during analysis of the header information or when the payload length of the TS packet is out of a predetermined range or when IP packet loss occurs during distribution in the network, the error determining unit 204 determines that there is an error in such header information.

Furthermore, the error determining unit 204 determines, using the header information stored in the header information storing unit 207, whether or not the current header information is appropriate. Specifically, when the common header information in the video signals of the same view is not the same as the header information of the preceding sequence or when a difference between the present header information and the preceding header information is equal to or greater than the third threshold, the error determining unit 204 determines that there is an error in the current header information.

When the error determining unit 204 determines that there is an error in the header information, the complementing unit 208 complements the header information which includes the error, using the preceding header information included in the video signals of the same view or the header information included in the video signals of a different view at the corresponding presentation time point.

The decoding unit 103 generates the left-eye decode signals 113L by decoding the left-eye code signals 112L using the header information included therein. Furthermore, the decoding unit 103 generates the right-eye decode signals 113R by decoding the right-eye code signals 112R using the header information included therein. In addition, the decoding unit 103 generates the decode video signals 113 including the left-eye decode signals 113L and the right-eye decode signals 113R. When there is an error in the header information of the input video signals 112, the decoding unit 103 decodes the input video signals 112 using the header information complemented by the complementing unit 208.

The output unit 106 outputs the left-eye decode signals 113L and the right-eye decode signals 113R as the output video signals 117.

The following describes an operation of the 3D video decoding apparatus 200.

Figure 19:
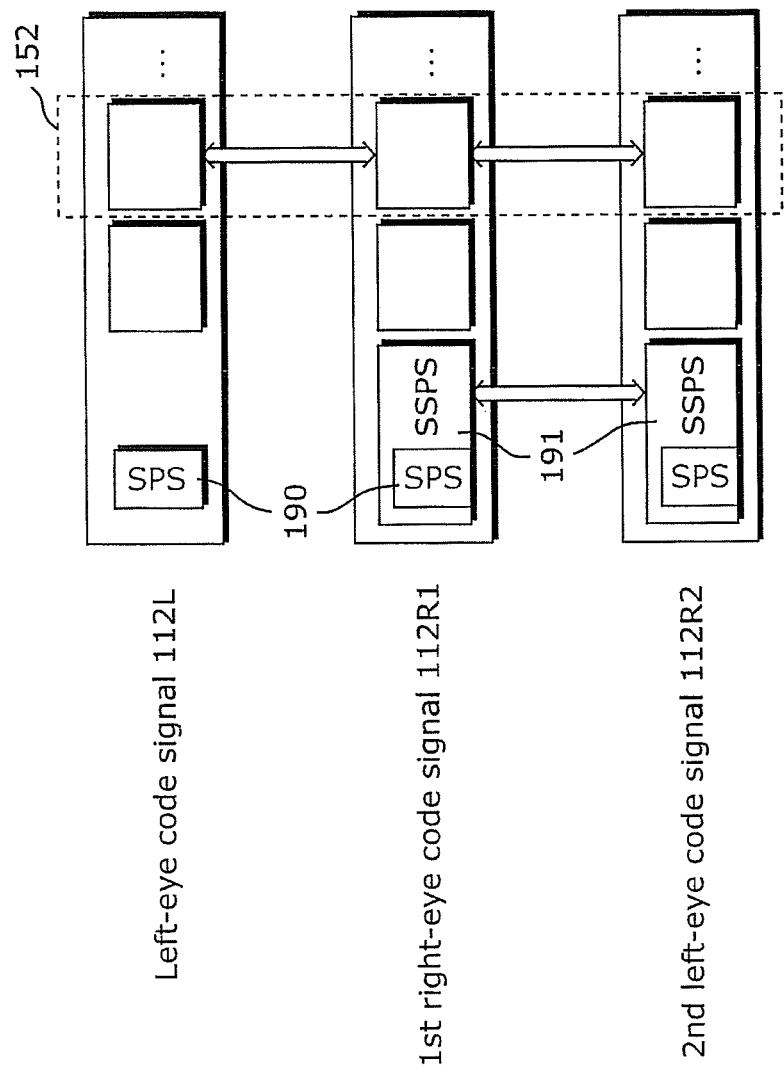
FIG. 19 shows a complementing process of the 3D video decoding apparatus according to the third embodiment of the present invention.
Figure 20:
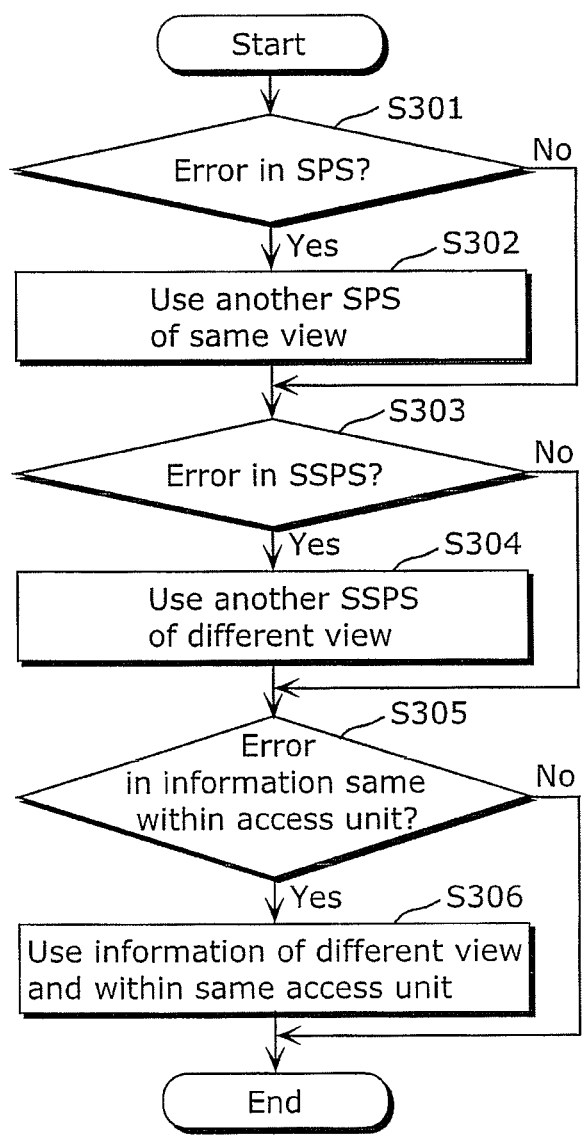
FIG. 20 is a flowchart showing the complementing process of the 3D video decoding apparatus according to the third embodiment of the present invention.

FIG. 19 shows a complementing process of the 3D video decoding apparatus 200. FIG. 20 is a flowchart showing the complementing process of the 3D video decoding apparatus 200.

As shown in FIG. 19, the input video signal 112 includes the left-eye code signal 112L, the first right-eye code signal 112R1, and the second right-eye code signal 112R2. That is, the right-eye code signal 112R includes the first right-eye code signal 112R1 and the second right-eye code signal 112R2. These first right-eye code signal 112R1 and second right-eye code signal 112R2 are both dependent views. For example, the first right-eye code signal 112R1 and the second right-eye code signal 112R2 are right-eye vide signals which have different parallaxes (shift amounts) with respect to the left-eye code signal 112L.

The decoding unit 103 generates the first right-eye decode signals by decoding the first right-eye code signals 112R1 using the header information included therein. The decoding unit 103 generates the second right-eye decode signals by decoding the second right-eye code signals 212R2 using the header information included therein. The decoding unit 103 then outputs the decoded video signals 113 including the left-eye decode signals 113L, the first right-eye decode signals and the second right-eye decode signals.

The output unit 106 outputs the left-eye decode signals 113L, the first right-eye decode signals, and the second right-eye decode signals, as the output video signals 117.

It is also possible that the decoding unit 103 generates the right-eye decode signal 113R by decoding one of the first right-eye code signal 112R1 and the second right-eye code signal 112R2 selectively according to a control signal or the like from outside. In this case, the output unit 106 outputs, as the output video signals 117, the left-eye decode signals 113L and the right-eye decode signals 113R generated by the decoding unit 103.

Furthermore, each of the left-eye code signal 112L, the first right-eye code signal 112R1, and the second right-eye code signal 112R includes a sequence parameter set (SPS) 190. In addition, each of the first right-eye code signal 112R1 and the second right-eye code signal 112R2 includes a subset SPS (SSPS) 191. These SPS 190 and SSPS 191 are included in the sequence header 161 shown in FIG. 7.

The SPS 190 is control information which is common to the plurality of picture data 162 included in the corresponding sequence data 160. The SSPS 191 is information indicating a relation of the video signals among the views (a relation among the left-eye code signal 112L, the first right-eye code signal 112R1, and the second right-eye code signal 112R2).

As shown in FIG. 20, when there is an error in the SPS 190 (Yes in S301), the complementing unit 208 reads, from the header information storing unit 207, the SPS 190 of another normal sequence included in the code signals of the same view, and replaces the SPS 190 which includes the error, by the read normal SPS 190 (S302).

It is to be noted that the complementing unit 208 may use not only the SPS 190 but also other information in other normal sequences or pictures as long as the information is the same within the code signals of the same view. The information which is the same within the code signals of the same view is, for example, priority_id and view_id in the H.264 MVC standard. Here, priority_id indicates a priority in decoding the code signals of the corresponding view. In other words, priority_id indicates the order of decoding the code signals of a plurality of views. Furthermore, view_id is information for identifying the code signals of the corresponding view. For example, "0" is assigned to a base view while "1, 2 . . ." are assigned to dependent views.

Furthermore, when there is an error in the SSPS 191 (Yes in S303), the complementing unit 208 replaces the SSPS 191 which includes the error, by the normal SSPS 191 included in the code signals of a different view (S304).

Furthermore, when there is an error in the information which is the same within the access unit 152 (Yes in S305), the complementing unit 208 replaces the information which includes the error, by the normal information which is included in the video signals of a different view and included in the same access unit 152 (S306).

The information which is the same within the access unit is, for example, non_idr_flag and anchor_pic_flag in the H.264 MVC standard, and nal_unit_type and temporal_id in the BD standard.

Here, non_idr_flag is information indicating whether or not the picture is an IDR picture. The IDR picture is a kind of I picture, and it is forbidden that a picture succeeding the IDR picture refers to a picture preceding the IDR picture. This non_idr_flag indicates that a picture of at least a base view is an IDR picture, and it is therefore not required that a picture of a dependent view is an IDR picture.

Here, anchor_pic_flag is information indicating whether or not the picture is an initial picture of a sequence.

Furthermore, nal_unit_type is information indicating a data attribute. For example, nal_unit_type indicates whether the data is header information or an IDR picture.

Furthermore, temporal_id is an identifier indicating the order of decoding a plurality of pictures. To each of successive pictures, serial numbered temporal_id is assigned.

As above, when there is an error in the header information which is common to different views and within the same access unit 152, the 3D video decoding apparatus 200 according to the third embodiment of the present invention complements the header information which includes the error, using the header information of the coded picture which is of a different view and within the same access unit 152. This allows the 3D video decoding apparatus 200 to appropriately complement the header information which includes the error, and thereby generate favorable video images when there is an error.

Furthermore, when there is an error in the header information which is common within the video signals of the same view, the 3D video decoding apparatus 200 according to the third embodiment of the present invention complements the header information which includes the error, using the normal header information of a different sequence or coded picture which is included in the video signals of the same view. This allows the 3D video decoding apparatus 200 to appropriately complement the header information which includes the error, and thereby generate favorable video images when there is an error.

Furthermore, when there is an error in the SSPS 191, the 3D video decoding apparatus 200 according to the third embodiment of the present invention complements the SSPS 191 which includes the error, using the SSPS 191 of a different dependent view. This allows the 3D video decoding apparatus 200 to appropriately complement the SSPS 191 which includes the error, and thereby generate favorable video images when there is an error.

It is to be noted that the complementing unit 208 may not only replace the header information which includes an error, by the normal header information which is included in the video signals of the same or different view, but also complement the header information which includes an error, using the normal header information.

Specifically, when nal_unit_type of the base view indicates that the picture is an IDR picture, the complementing unit 208 is capable of complementing non_idr_flag of the picture of the base view. In addition, the complementing unit 208 is capable of complementing non_idr_flag of the dependent view by assigning the value of complemented non_idr_flag of the base view.

Furthermore, the complementing unit 208 is capable of complementing also anchor_pic_flag of the dependent view using stream information (indicating a position of the SPS 190 and indicating that the picture is an I picture) of the base view.

Furthermore, while the above description gives an example where the 3D video decoding apparatus 200 processes the video signals of the three views, it may process video signals of four or more views.

Furthermore, the above describes the 3D video decoding apparatus 200 according to the third embodiment of the present invention which performs the following processes: (i) when there is an error in the header information which is common to different views and within the same access unit 152, a process of complementing the header information which includes the error, using the header information of the picture which is of a different view and within the same access unit 152; (ii) when there is an error in the header information which is common within the video signals of the same view, a process of complementing the header information which includes the error, using the normal header information of a different sequence or picture which is included in the video signals of the same view; and (iii) when there is an error in the SSPS 191, a process of complementing the SSPS 191 which includes the error, using the SSPS 191 of a different dependent view, but the 3D video decoding apparatus 200 may perform one or more of the above processes.

Furthermore, the order of the processes shown in FIG. 20 is an example, and other orders of the processes are applicable as long as they can lead to the same or like effects. Part of the processes may be performed at the same time.

Fourth Embodiment

A 3D video decoding apparatus 300 according to the fourth embodiment of the present invention selects one of the 2D presentation and the 3D presentation, according to the playback mode (which includes the normal playback and the trick playback).

The 3D video decoding apparatus 300 according to the fourth embodiment of the present invention can be applied to the 3D video display system 10 shown in FIG. 1, as in the case of the 3D video decoding apparatus 100 according to the first embodiment.

Figure 21:
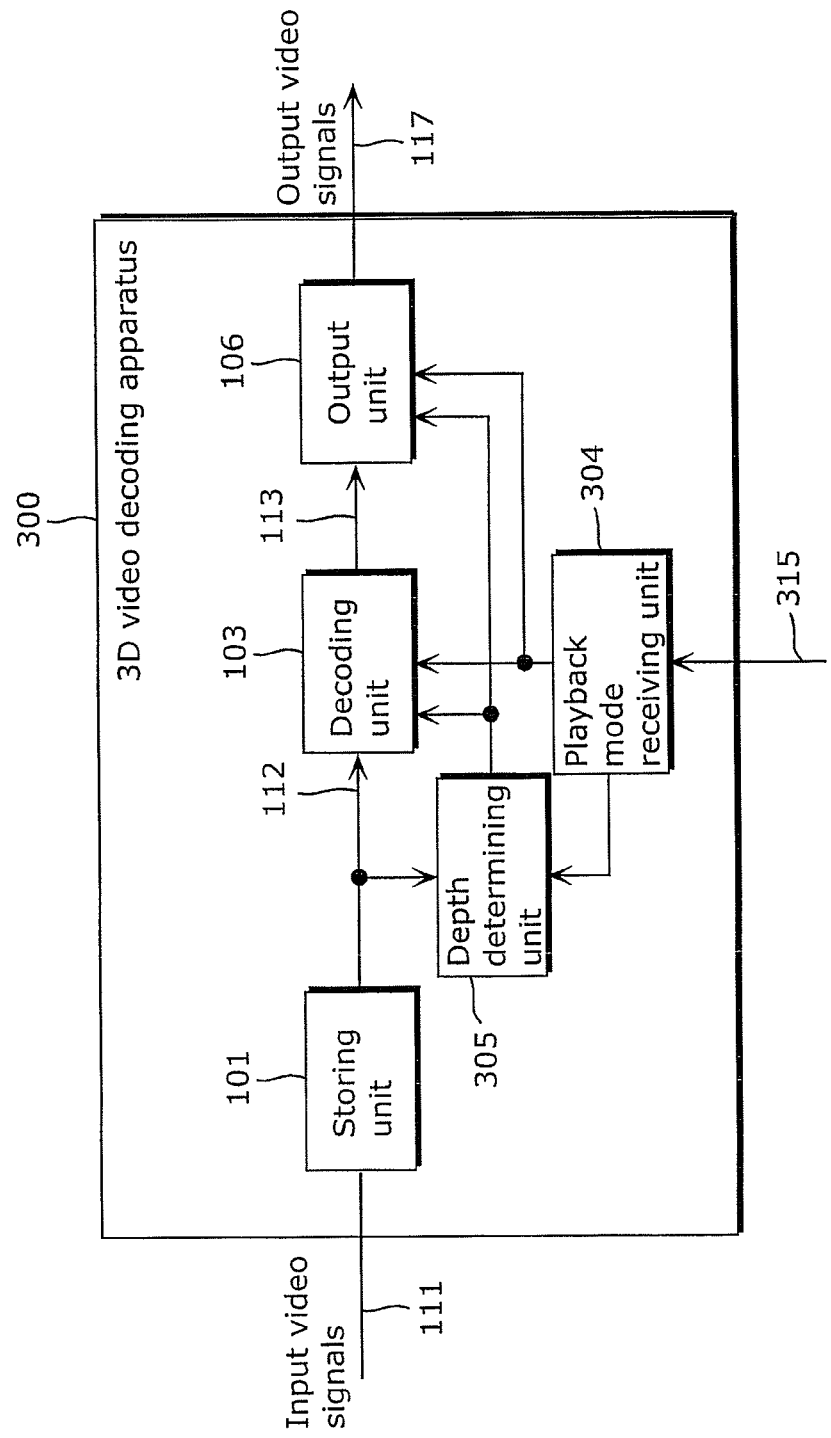
FIG. 21 is a block diagram showing a structure of a 3D video decoding apparatus according to the fourth embodiment of the present invention.

FIG. 21 is a block diagram showing a structure of the 3D video decoding apparatus 300 according to the fourth embodiment of the present invention. In the figure, components common with FIG. 5 have the same numerals.

This 3D video decoding apparatus 300 decodes the input video signals 111 and outputs the output video signals 117 which are reproduced in the normal playback mode or in the trick play mode. This 3D video decoding apparatus 300 includes the storing unit 101, the decoding unit 103, a playback mode receiving unit 304, a depth determining unit 305, and the output unit 106.

The storing unit 101 stores the input video signals 111 and outputs them as the input video signals 112.

The playback mode receiving unit 304 receives, based on playback mode designating signals 315, the playback mode designated by user operation or the like. The playback mode includes a normal playback mode and a trick play mode. The trick play mode includes a fast playback mode (a high-speed playback mode), a slow playback mode, a frame-by-frame playback mode, a reverse playback mode, a reverse slow playback mode, and a reverse frame-by-frame mode. The fast playback mode includes a plurality of fast playback modes at different speeds (which include a 1.3× playback mode, a 1.6× playback mode, and a 2× playback mode).

Furthermore, the fast playback mode is a mode in which the pictures in the normal playback mode are partly skipped when displayed. The reverse playback mode (the reverse slow playback mode and the reverse frame-by-frame playback mode) is a mode in which the pictures in the normal playback mode are displayed in reverse order.

The decoding unit 103 decodes the left-eye code signals 112L and the right-eye code signals 112R and thereby generate the decode video signals 113 including the left-eye decode signals 113L and the right-eye decode signals 113R. Furthermore, the decoding unit 103 performs a decoding process according to the playback mode received by the playback mode receiving unit 304 and thereby generates the decode video signals 113 which are in the normal playback mode or in the trick play mode.

The output unit 106 outputs the left-eye decode signals 113L and the right-eye decode signals 113R as the output video signals 117. Furthermore, according to the playback mode received by the playback mode receiving unit 304, the output unit 106 selects to output the left-eye decode signals 113L and the right-eye decode signals 113R as the output video signals 117 or to output only the left-eye decode signals 113L as the output video signals 117.

The depth determining unit 305 calculates, using the information included in the input video signals 112, an amount of change in the depth of the decode video signals 113 (that is a depth-wise position in the 3D presentation represented by the left-eye decode signals 113L and the right-eye decode signals 113R). Furthermore, the depth determining unit 305 determines whether or not the calculated amount of change is equal to or greater than the fourth predetermined threshold.

Figure 22:
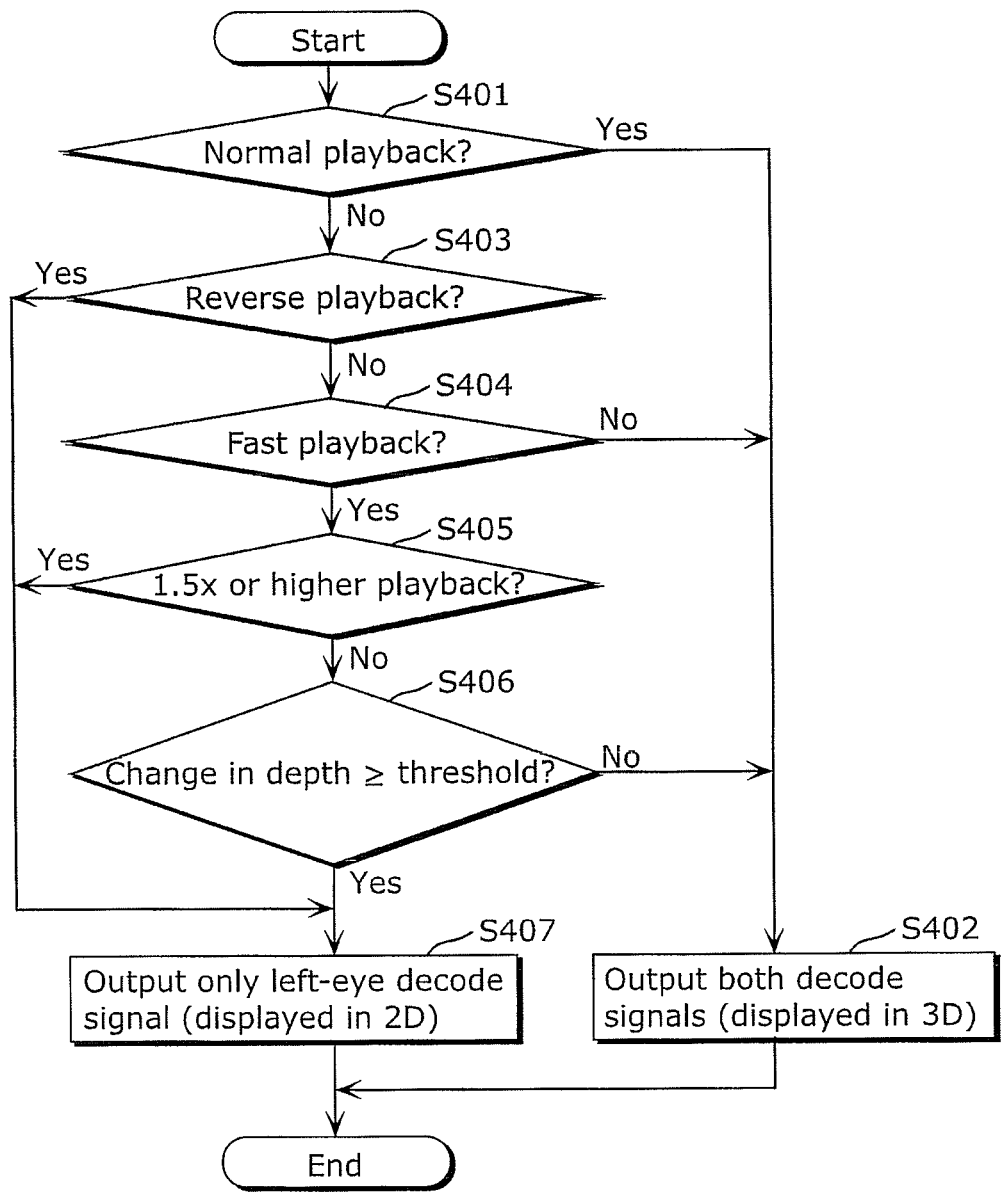
FIG. 22 is a flowchart showing a decoding process of the 3D video decoding apparatus according to the fourth embodiment of the present invention.

FIG. 22 is a flowchart showing a decoding process of the 3D video decoding apparatus 300.

As shown in FIG. 22, when the playback mode received by the playback mode receiving unit 304 is the normal playback mode (Yes in S401), the decoding unit 103 decodes the left-eye code signals 112L and the right-eye code signals 112R and thereby generates the left-eye decode signals 113L and the right-eye decode signals 113. The output unit 106 outputs the left-eye decode signals 113L and the right-eye decode signals 113R as the output video signals 117 (S402). This allows the display panel 26 to display the 3D video images in the normal playback mode.

On the other hand, when the playback mode received by the playback mode receiving unit 304 is the reverse playback mode, the reverse slow playback mode, or the reverse frame-by-frame mode, the decoding unit 103 decodes only the left-eye code signals 112L and thereby generates the left-eye decode signals 113L. The output unit 106 outputs only the left-eye decode signals 113L as the output video signals 117 (S407). This allows the display panel 26 to display the 2D video images in the reverse playback mode.

When the playback mode received by the playback mode receiving unit 304 is the fast playback mode which is at 1.5× or higher speed (Yes in S404 and Yes in S405), the decoding unit 103 decodes only the left-eye code signals 112L and thereby generates the left-eye decode signals 113L. The output unit 106 outputs only the left-eye decode signals 113L as the output video signals 117 (S407). This allows the display panel 26 to display the 2D video images in the fast playback mode.

When the playback mode received by the playback mode receiving unit 304 is the fast playback mode which is at speed slower than 1.5× (Yes in S404 and No in S405), then the depth determining unit 305 calculates the amount of change in the depth of the input video signals 112 and determines whether the calculated amount of change is equal to or greater than the fourth threshold or is smaller than the fourth threshold (S406).

Specifically, the input video signals 112 include depth information indicating a depth of the decode video signals 113. When there are a plurality of depths in an image to be displayed; for example, in the case of an image where the upper part is to be displayed in back while the lower part is to be displayed in front, the input video signals 112 may include separate depth information for each of the regions obtained by sectioning the image. With reference to this depth information, the depth of a subtitle is corrected so that the video (the primary video image) does not penetrate the subtitle.

Using this depth information, the depth determining unit 305 determines the amount of change in the depth of the decode video signals 113. Specifically, when the amount of change in the depth indicated by the depth information is equal to or greater than the fifth threshold, the depth determining unit 305 determines that the amount of change in the depth of the decode video signals 113 is equal to or greater than the fourth threshold, and when the amount of change in the depth indicated by the depth information is smaller than the fifth threshold, the amount of change in the depth of the decode video signals 113 is smaller than the fourth threshold.

The amount of change indicates, for example, the maximum or average value of the amounts of change among the successive pictures in part or all of the playback sections.

When the depth determining unit 305 determines that the amount of change in the depth is equal to or greater than the fourth threshold (Yes in S406), the decoding unit 103 decodes only the left-eye code signals 112L and thereby generates the left-eye decode signals 113L. The output unit 106 outputs only the left-eye decode signals 113L as the output video signals 117 (S407). This allows the display panel 26 to display the 2D video images in the fast playback mode.

On the other hand, when the depth determining unit 305 determines that the amount of change in the depth is smaller than the fourth threshold (No in S406), the decoding unit 103 decodes the left-eye code signals 112L and the right-eye code signals 112R and thereby generates the left-eye decode signals 113L and the right-eye decode signals 113R. The output unit 106 outputs the left-eye decode signals 113L and the right-eye decode signals 113R as the output video signals 117 (S402). This allows the display panel 26 to display the 3D video images in the fast playback mode.

When the playback mode received by the playback mode receiving unit 304 is the trick play mode which is other than the reverse playback mode and the fast playback mode (No in S401, No in S402, and No in S403), that is, when the playback mode received by the playback mode receiving unit 304 is the slow playback mode or the frame-by-frame playback mode, the decoding unit 103 decodes the left-eye code signals 112L and the right-eye code signals 112R and thereby generates the left-eye decode signals 113L and the right-eye decode signals 113R. The output unit 106 outputs the left-eye decode signals 113L and the right-eye decode signals 113R as the output video signals 117 (S402). This allows the display panel 26 to display the 3D video images in the slow playback mode or in the frame-by-frame playback mode.

As above, in the fast playback mode, the 3D video decoding apparatus 300 according to the fourth embodiment of the present invention provides the 2D presentation by outputting the left-eye decode signals 113L only. This allows the 3D video decoding apparatus 300 to prevent the 3D video images which intensely change in the depth, from being displayed in the fast playback mode.

Furthermore, the 3D video decoding apparatus 300 according to the fourth embodiment of the present invention provides: the 2D presentation when the playback speed in the fast playback mode is equal to or greater than a predetermined threshold; and the 3D presentation when the playback speed in the fast playback mode is smaller than the predetermined threshold. This allows the 3D video decoding apparatus 300 to provide the 2D presentation when the change in the depth is intense due to a high playback speed. In addition, the 3D video decoding apparatus 300 provides the 3D presentation when the playback speed is relatively low.

Furthermore, in the fast playback mode, the 3D video decoding apparatus 300 according to the fourth embodiment of the present invention provides: the 2D presentation when the depth intensely changes; and the 3D presentation when the change in the depth is small. This allows the 3D video decoding apparatus 300 to provide the 2D presentation when the change in the depth is intense. In addition, the 3D video decoding apparatus 300 provides the 3D presentation when the change in the depth is small.

Thus, the 3D video decoding apparatus 300 according to the fourth embodiment of the present invention is capable of generating favorable video images in the trick play mode.

Furthermore, the 3D video decoding apparatus 300 according to the fourth embodiment of the present invention performs the 2D presentation in the reverse playback mode. In the reverse playback mode, the decoding process has a higher processing amount than that in the normal playback mode. This is because a picture to be referred to by the current picture to be decoded is predetermined on the premise that the pictures are displayed in the forward direction. In the reverse playback mode, it therefore becomes necessary to decode the picture which is to be referred to by the current picture to be decoded. This means that, in the case of reproducing, in the reverse playback mode, the picture which is decoded last in a sequence (GOP) in the forward playback mode, all the reference coded pictures (I pictures and P pictures) within the sequence need to be decoded. It thus takes a longer time to decode a picture closer to the end of a sequence. Thus, when the processing capability of the decoding unit 103 is not sufficient, there are unequal display intervals; that is, pictures closer to the end of a sequence have a longer display interval, in the reverse playback mode. Alternatively, when all the pictures have the display interval which is equal to the display interval for the most-time-consuming decoding process, there arises a problem of a decrease in the playback speed in the reverse playback mode.

On the other hand, the 3D video decoding apparatus 300 according to the fourth embodiment of the present invention provides the 2D presentation in the reverse playback mode so that the processing amount of the decoding unit 103 can be lower as compared to the case of the 3D presentation. This allows the 3D video decoding apparatus 300 to prevent the above-mentioned unequal display intervals and thereby generate favorable video images in the trick play mode. Furthermore, the 3D video decoding apparatus 300 is capable of improving the playback speed in the reverse playback mode. In addition, the 3D video decoding apparatus 300 is capable of improving the response in the reverse frame-by-frame playback mode.

The above describes the 3D video decoding apparatus 300 according to the fourth embodiment of the invention which performs the following processes: (i) a process of providing the 2D presentation in the fast playback mode; (ii) a process of providing the 2D presentation when the playback speed in the fast playback mode is equal to or greater than a predetermined threshold, and providing the 3D presentation when the playback speed in the fast playback mode is smaller than the predetermined threshold; (iii) a process of providing the 2D presentation when the depth intensely changes, and providing the 3D presentation when the change in the depth is small; and (iv) providing the 2D presentation in the reverse playback mode, but it is sufficient that the 3D video decoding apparatus 300 performs one or more of the above processes.

Furthermore, the order of the processes shown in FIG. 22 is an example, and other orders of the processes are applicable as long as they can lead to the same or like effects. Part of the processes may be performed at the same time.

Furthermore, while the above describes the 3D video decoding apparatus 300 which provides the 2D presentation when the playback speed in the fast playback mode is equal to or greater than a predetermined speed (Yes in S405), the 3D video decoding apparatus 300 may further select to provide the 2D presentation or to provide the 3D presentation, according to whether or not the amount of change in the depth is equal to or greater than a threshold as in Step S406.

While the above describes the 3D video decoding apparatuses 100, 200, and 300 according to the first to fourth embodiments of the present invention, the present invention is not limited to these embodiments.

For example, the above description illustrates an example where a pair of dedicated glasses (the shutter glasses 43) is used, but the present invention is applicable also to a system which uses no dedicated glasses.

Furthermore, while the above description illustrates an example where each of the 3D video decoding apparatuses 100, 200, and 300 according to the implementations of the present invention is applied to a digital television and a digital video recorder, the 3D video decoding apparatuses 100, 200, and 300 according to the implementations of the present invention may be applied to 3D video display devices (such as mobile phone devices and personal computers) other than the digital television, which display 3D video. Furthermore, the 3D video decoding apparatuses 100, 200, and 300 according to the implementations of the present invention are applicable to 3D video output devices (such as BD players) other than the digital video recorder, which output 3D video.

Furthermore, each of the above 3D video decoding apparatuses 100, 200, and 300 according to the first to fourth embodiments is typically implemented as a large-scale integration (LSI) that is an integrated circuit. Components may be each formed into a single chip, and it is also possible to integrate part or all of the components in a single chip.

This circuit integration is not limited to the LSI and may be achieved by providing a dedicated circuit or using a general-purpose processor. It is also possible to utilize a field programmable gate array (FPGA), with which LSI is programmable after manufacture, or a reconfigurable processor, with which connections, settings, etc., of circuit cells in LSI are reconfigurable.

Furthermore, if any other circuit integration technology to replace LSI emerges thanks to semiconductor technology development or other derivative technology, such technology may, of course, be used to integrate the processing units.

Moreover, the processor such as CPU may execute a program to perform part or all of the functions of the 3D video decoding apparatuses 100, 200, and 300 according to the first to fourth embodiments of the present invention.

Furthermore, the present invention may be the above program or a recording medium on which the above program has been recorded. It goes without saying that the above program may be distributed via a communication network such as the Internet.

Furthermore, the present invention may be implemented as a 3D video decoding method which includes, as steps, characteristic means included in the 3D video decoding apparatus. The present invention may also be implemented as a 3D video display apparatus, such as a digital television, which includes the above-described 3D video decoding apparatus, and implemented as a 3D video display system which includes the 3D video display apparatus.

Furthermore, it may also be possible to combine at least part of functions of the above-described 3D video decoding apparatuses 100, 200, and 300 according to the first to fourth embodiments and variations thereof.

All the numbers herein are given as examples to provide specific explanations of the present invention, and the present invention is thus not restricted by those numbers.

Furthermore, the structures of the above-described 3D video decoding apparatuses 100, 200, and 300 are given as examples to provide specific explanations of the present invention, and thus, the 3D video decoding apparatus according to an implementation of the present invention does not necessarily require all the above structures. In other words, it is sufficient that the 3D video decoding apparatus according to an implementation of the present invention includes only the minimum structure that can provide an effect of the present invention.

Likewise, the above-described 3D video decoding methods executed by the 3D video decoding apparatuses are given as examples to provide specific explanations of the present invention, and thus, the 3D video decoding method executed by the 3D video decoding apparatus, according to an implementation of the present invention, does not necessarily require all the above steps. In other words, it is sufficient that the 3D video decoding method according to an implementation of the present invention includes only the minimum steps that can provide an effect of the present invention. In addition, the execution order of the above steps is given as an example to provide specific explanations of the present invention and therefore may be other order than that illustrated above. A part of the above step may be carried out at the same time as (in parallel with) another step.

Furthermore, the present invention encompasses various embodiments that are obtained by making various modifications which those skilled in the art could think of, to the present embodiments, without departing from the spirit or scope of the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to 3D video decoding apparatuses and particularly to digital video recorders, digital televisions, and the like.

What is claimed is:

1. A three-dimensional (3D) video decoding apparatus which decodes a first code signal obtained by coding a video signal of a first view, and a second code signal obtained by coding a video signal of a second view that is different from the first view, said 3D video decoding apparatus comprising:
a decoding unit configured to decode the first code signal to generate a first decode signal, and to decode the second code signal to generate a second decode signal;
an error determining unit configured to determine, for each predetermined data amount, whether or not there is an error in the first code signal and in the second code signal;
an output determining unit configured to determine, when said error determining unit determines that there is an error in one of the first and the second code signals assigned with corresponding presentation time points and that there is no error in the other of the first and the second code signals, whether or not the one of the first and the second code signals that is determined as including an error has an error data amount equal to or greater than a first threshold; and
an output unit configured not to output the first or the second decode signal that corresponds to the one or the other of the first and the second code signals, when said output determining unit determines that the error data amount is smaller than the first threshold, and to output only the first or the second decode signal which is obtained by decoding the other of the first and the second code signals, when said output determining unit determines that the error data amount is equal to or greater than the first threshold.

2. The 3D video decoding apparatus according to claim 1, wherein said decoding unit is configured to decode the first code signal with reference to the first decode signal already decoded, and to decode the second code signal with reference to the first and the second decode signals already decoded,
said output determining unit is further configured to determine, when said error determining unit determines that there is an error in one of the first and the second code signals assigned with the corresponding presentation time points and that there is no error in the other of the first and the second code signals, whether the one of the first and the second code signals is the first code signal or the second code signal, and
said output unit is configured not to output the first or the second decode signal that corresponds to the one or the other of the first and the second code signals, when said output determining unit determines that the one of the first and the second code signals is the first code signal, and to output only the first decode signal which is obtained by decoding the other of the first and the second code signals, when said output determining unit determines that the error data amount is equal to or greater than the first threshold and that the one of the first and the second code signals is the second code signal.

3. The 3D video decoding apparatus according to claim 2, wherein each of the first code signal and the second code signal includes a plurality of group data each of which includes a plurality of coded pictures and information common to the coded pictures, and
said output determining unit is further configured to determine whether an error coded picture determined as including an error by said error determining unit is a reference coded picture or a non-reference coded picture, the reference coded picture being decoded to generate a decoded picture which is referred to when said decoding unit decodes another coded picture, and the non-reference coded picture being decoded to generate a decoded picture which is not referred to when said decoding unit decodes another coded picture, and
said output unit is configured not to output decoded pictures which correspond to the error coded picture and a coded picture which is included in the group data including the error coded picture and succeeds the error coded picture, when said error determining unit determines that the error coded picture is the reference coded picture, and configured not to output the decoded picture which corresponds to the error coded picture, when said error determining unit determines that the error coded picture is the non-reference coded picture.

4. The 3D video decoding apparatus according to claim 3, wherein said output unit is configured to determine not to output the first or the second decode signal that corresponds to the one or the other of the first and the second code signals, when said error determining unit determines that the error coded picture is the non-reference coded picture, and configured to determine to output only the first or the second decode signal which is obtained by decoding the other of the first and the second code signals, when said error determining unit determines that the error coded picture is the reference coded picture.

5. A three-dimensional (3D) video decoding method of decoding a first code signal obtained by coding a video signal of a first view, and a second code signal obtained by coding a video signal of a second view that is different from the first view, said 3D video decoding method comprising:
decoding the first code signal to generate a first decode signal, and decoding the second code signal to generate a second decode signal;
determining, for each predetermined data amount, whether or not there is an error in the first code signal and in the second code signal;
determining, when it is determined in said determining of an error that there is an error in one of the first and the second code signals assigned with corresponding presentation time points and that there is no error in the other of the first and the second code signals, whether or not the one of the first and the second code signals that is determined as including an error has an error data amount equal to or greater than a first threshold; and not outputting the first or the second decode signal that corresponds to the one or the other of the first and the second code signals, when it is determined in said determining of an error data amount that the error data amount is smaller than the first threshold, and outputting only the first or the second decode signal which is obtained by decoding the other of the first and the second code signals, when it is determined in said determining of an error data amount that the error data amount is equal to or greater than the first threshold.

\* \* \* \* \*